United States Patent
Rih et al.

(10) Patent No.: US 12,246,565 B2
(45) Date of Patent: Mar. 11, 2025

(54) PNEUMATIC TIRE COMPRISING SPECIFIED HOOP REINFORCER ELEMENT

(71) Applicant: COMPAGNIE GENERALE DES ETABLISSEMENTS MICHELIN, Clermont-Ferrand (FR)

(72) Inventors: Sabrina Rih, Clermont-Ferrand (FR); Richard Cornille, Clermont-Ferrand (FR); Herve Ferigo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1172 days.

(21) Appl. No.: 16/956,892

(22) PCT Filed: Dec. 13, 2018

(86) PCT No.: PCT/FR2018/053268
§ 371 (c)(1),
(2) Date: Jan. 22, 2021

(87) PCT Pub. No.: WO2019/122619
PCT Pub. Date: Jun. 27, 2019

(65) Prior Publication Data
US 2021/0155044 A1 May 27, 2021

(30) Foreign Application Priority Data
Dec. 22, 2017 (FR) ........................................ 1763122

(51) Int. Cl.
*B60C 9/22* (2006.01)
*B60C 9/00* (2006.01)
*B60C 9/20* (2006.01)

(52) U.S. Cl.
CPC ............ *B60C 9/005* (2013.01); *B60C 9/2009* (2013.01); *B60C 9/22* (2013.01); *B60C 9/2204* (2013.01);
(Continued)

(58) Field of Classification Search
None
See application file for complete search history.

(56) References Cited

U.S. PATENT DOCUMENTS

| 3,327,753 A | 6/1967 | Travers |
| 4,839,113 A | 6/1989 | Villaine et al. |

(Continued)

FOREIGN PATENT DOCUMENTS

| DE | 41 35 599 A1 | 5/1993 |
| EP | 0310171 A2 | 4/1989 |

(Continued)

OTHER PUBLICATIONS

English machine translation of EP 1 878 591 A2, Jan. 16, 2008.*

(Continued)

*Primary Examiner* — Adrienne C. Johnstone
(74) *Attorney, Agent, or Firm* — VENABLE LLP

(57) ABSTRACT

The invention relates to a tyre (10) comprising a hooping ply (19) comprising at least one textile wire-like hoop reinforcer element making an angle strictly less than 10° with the circumferential direction (Z) of the tyre (10). The bonded textile wire-like reinforcer element has, before the step of production of the hooping ply (19), a tangent modulus less than or equal to 5 cN/tex/% for any elongation less than or equal to 3%. The textile wire-like hoop reinforcer element has, once extracted from the tyre (10), a tangent modulus greater than or equal to 5 cN/tex/% for any elongation greater than or equal to 4%.

14 Claims, 3 Drawing Sheets

(52) U.S. Cl.
CPC ............... *B60C 2009/2214* (2013.01); *B60C 2009/2257* (2013.01); *B60C 2009/2261* (2013.01); *B60C 2009/228* (2013.01); *B60C 2009/2285* (2013.01)

(56) References Cited

U.S. PATENT DOCUMENTS

| | | | |
|---|---|---|---|
| 4,987,939 | A | 1/1991 | Yamada et al. |
| 6,093,490 | A | 7/2000 | Meraldi et al. |
| 6,261,689 | B1 | 7/2001 | Meraldi et al. |
| 6,818,728 | B2 | 11/2004 | Kato et al. |
| 6,881,478 | B2 | 4/2005 | Kato et al. |
| 7,222,481 | B2 | 5/2007 | Esnault et al. |
| 8,640,753 | B2 | 2/2014 | Rampana et al. |
| 8,813,467 | B2 | 8/2014 | Rampana et al. |
| 2003/0026981 | A1 | 2/2003 | Kato et al. |
| 2004/0118499 | A1 | 6/2004 | Reuter et al. |
| 2004/0265581 | A1 | 12/2004 | Esnault et al. |
| 2005/0031864 | A1 | 2/2005 | Kato et al. |
| 2006/0027310 | A1 | 2/2006 | Auclair |
| 2007/0017620 | A1 | 1/2007 | Donckels et al. |
| 2007/0137754 | A1 | 6/2007 | Westgate et al. |
| 2007/0169867 | A1 | 7/2007 | Esnault et al. |
| 2009/0266462 | A1 | 10/2009 | Yamamoto et al. |
| 2010/0024948 | A1 | 2/2010 | Westgate et al. |
| 2010/0224298 | A1 | 9/2010 | Rampana et al. |
| 2012/0186218 | A1 | 7/2012 | Westgate et al. |
| 2013/0042593 | A1 | 2/2013 | Rampana et al. |
| 2013/0146200 | A1 | 6/2013 | Westgate et al. |
| 2013/0239539 | A1 | 9/2013 | Li et al. |
| 2015/0298408 | A1* | 10/2015 | Fukumoto ............... B60C 9/005 |
| 2017/0274706 | A1 | 9/2017 | Reese et al. |
| 2018/0093532 | A1 | 4/2018 | Bestgen et al. |
| 2018/0117970 | A1 | 5/2018 | Le Clerc et al. |
| 2020/0231012 | A1 | 7/2020 | Ferigo et al. |
| 2020/0316999 | A1* | 10/2020 | Rih ........................ B60C 9/005 |
| 2021/0053307 | A1 | 2/2021 | Rih et al. |
| 2021/0155045 | A1 | 5/2021 | Bosquet et al. |

FOREIGN PATENT DOCUMENTS

| | | |
|---|---|---|
| EP | 0456306 A1 | 11/1991 |
| EP | 1431076 A1 | 6/2004 |
| EP | 1623819 A1 | 2/2006 |
| EP | 1800901 A2 | 6/2007 |
| EP | 1 878 591 A2 * | 1/2008 |
| EP | 1925467 A1 | 5/2008 |
| EP | 2 604 448 A2 | 6/2013 |
| FR | 1413102 | 10/1965 |
| WO | 85/05115 A1 | 11/1985 |
| WO | 97/06294 A1 | 2/1997 |
| WO | 02/068738 A1 | 9/2002 |
| WO | 03/060212 A1 | 7/2003 |
| WO | 2009/052844 A1 | 4/2009 |
| WO | 2012/083148 A1 | 6/2012 |
| WO | 2016/023656 A1 | 2/2016 |
| WO | 2016/166056 A1 | 10/2016 |
| WO | 2016/166057 A1 | 10/2016 |
| WO | WO-2018/096436 A1 * | 5/2018 |

OTHER PUBLICATIONS

International Search Report dated Feb. 12, 2019, in corresponding PCT/FR2018/053268 (5 pages).
Mechanics of Pneumatic Tires, S.K. Clark, ed., U.S. Dept. of Transportation, pp. 219-220 (1981).
A.N. Gent, et al., "Pneumatic Tire," U.S. Department of Transportation, DOT HS 810 561, p. 85 (2006).

* cited by examiner

PNEUMATIC TIRE COMPRISING SPECIFIED HOOP REINFORCER ELEMENT

BACKGROUND

The invention relates to tyres, and preferentially those for private passenger vehicles, but can be used on any other type of vehicle such as two-wheeled vehicles, heavy goods vehicles, agricultural vehicles, civil engineering vehicles or aeroplanes or, more generally, to any rolling device. A tyre is understood to mean a wrapping intended to form a cavity by cooperating with a support element, for example a rim, this cavity being able to be pressurized to a pressure greater than atmospheric pressure. A tyre according to the invention has a structure of substantially toroidal form.

Tyres comprising a crown and two side walls are known from the state of the art. These tyres conventionally comprise a carcass reinforcement anchored in two beads and topped radially by a crown reinforcement which is itself topped radially by a tread, the crown reinforcement being joined to said beads by the two side walls. The carcass reinforcement comprises a single carcass ply comprising wire-like carcass reinforcer elements. The crown reinforcement comprises a working reinforcement comprising two working plies comprising wire-like working reinforcer elements, the wire-like working reinforcer elements of the two plies forming angles with the circumferential direction of the tyre of opposite orientations from one working ply to another. The crown reinforcement also comprises a hoop reinforcement comprising a single hooping ply comprising textile wire-like hoop reinforcer elements.

The wire-like carcass and working reinforcer elements are arranged so as to define, in the crown, a triangular mesh.

On the one hand, the hoop reinforcement must make it possible, by virtue of suitable mechanical strength bake properties, to exert a sufficient hooping force on the crown of the tyre, notably when running at high speeds in order to guarantee that the profile of the tyre is maintained. On the other hand, the hoop reinforcement must allow, by virtue of suitable tension raw modulus properties, a radial expansion and therefore a circumferential elongation of the crown of the tyre so as not to prevent the radial and circumferential deformations imposed on the tyre in its production process, notably during the baking of the tyre during which the tyre is expanded radially and circumferentially, for example by the pressurization of an inflation membrane, so as to be pressed against the surfaces of the baking mould.

Such a tyre is notably described in U.S. Pat. No. 6,799,618. Because of the presence of two working plies, the textile wire-like hoop reinforcer elements have mechanical properties, notably a tangent modulus, that are relatively weak, both raw before the step of production of the hooping ply and on baking once extracted from the tyre, and this is so regardless of the elongation imposed. Thus, the hooping ply of U.S. Pat. No. 6,799,618 guarantees the possibility of radially and circumferentially deforming the tyre during its production process but by sacrificing the mechanical properties of the hooping ply and therefore of the crown reinforcement.

A tyre is known from WO2016/166056, in which the working reinforcement comprises a single working ply. Thus, the crown reinforcement of the tyre is lightened. In this tyre, the triangular mesh is assured by the particular arrangement, in the crown, of the wire-like carcass, working and hoop reinforcement elements. In WO2016/166056, because of the elimination of a working ply, the hooping ply comprises textile wire-like hoop reinforcer elements having a relatively high tangent modulus, whether that be raw before the step of production of the hooping ply or else on baking once extracted from the tyre, and this is in order to compensate for the elimination of one of the working plies. Thus, such textile wire-like hoop reinforcer elements, while they ensure the mechanical strength properties of the crown, they do not allow easy radial and circumferential deformations of the tyre during its production method, which creates a risk of penetration of the textile wire-like hoop reinforcer elements in the ply which is radially internal to the hooping ply and a risk of variation of the geometry obtained for the tyre compared to the expected geometry of the tyre.

SUMMARY

The aim of the invention is a tyre comprising a hooping ply that allows a lightening of the crown reinforcement of the tyre and that guarantees, on the one hand, sufficient mechanical strength properties and, on the other hand, an easy axial and circumferential deformation of the tyre during its production method.

To this end, the subject of the invention is a tyre comprising a crown reinforcement comprising a hooping reinforcement comprising a hooping ply comprising at least one textile wire-like hoop reinforcer element making an angle strictly less than 10° with the circumferential direction of the tyre. The tyre is obtained by a method comprising a step of production of the hooping ply in which at least one bonded textile wire-like reinforcer element is embedded in a compound to form the or each textile wire-like hoop reinforcer element.

In accordance with the invention, the or each bonded textile wire-like reinforcer element has, before the step of production of the hooping ply, a tangent modulus less than or equal to 5 cN/tex/% for any elongation less than or equal to 3% and, the or each textile wire-like hoop reinforcer element has, once extracted from the tyre, a tangent modulus greater than or equal to 5 cN/tex/% for any elongation greater than or equal to 4%.

By virtue of the properties defined above, the or each bonded textile wire-like reinforcer element has, before the step of production of the hooping ply, a force-elongation curve having a relatively small modulus at small elongations and, after the production of the tyre, the textile wire-like hoop reinforcer element has a relatively high modulus from small elongations.

On the one hand, such a textile wire-like reinforcer element allows, by virtue of a relatively small tangent modulus of the raw bonded textile wire-like element or elements, that is to say before the step of production of the hooping ply, an easy radial and circumferential deformation of the tyre during its production method. On the other hand, such a tyre makes it possible, by virtue of a relatively high tangent modulus of the textile wire-like hooping element or elements at bake, that is to say after the production of the tyre, to obtain a hooping reinforcement that is sufficiently mechanically robust and therefore to lighten the crown reinforcement of the tyre without risking degrading the performances of the tyre. The crown reinforcement could thus be lightened by reducing, for example, the number, the breaking force or even the size of the reinforcer elements of the working reinforcement. A particularly advantageous solution will be described below and consists in eliminating a working ply of the crown reinforcement.

BRIEF DESCRIPTION OF THE DRAWINGS

The invention will be better understood on reading the following description, given purely as a nonlimiting example and given with reference to the drawings in which.

DETAILED DESCRIPTION

Figure 1:
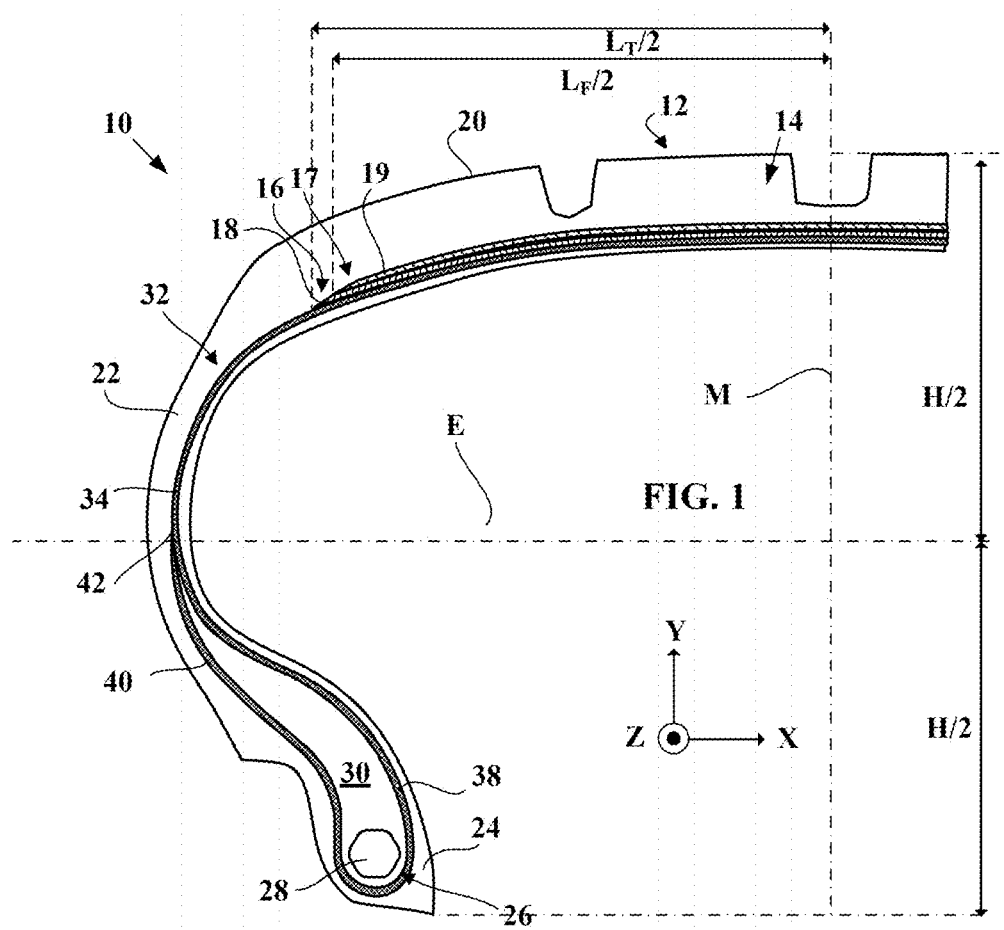
FIG. 1 is a section view at right angles to the circumferential direction of a tyre according to the invention.

Wire-like is understood to mean a reinforcer element extending longitudinally along a main axis and having a section at right angles to the main axis whose greatest dimension D is relatively small compared to the dimension L, along the main axis. Relatively small is understood to mean that L/D is greater than or equal to 100, preferably greater than or equal to 1000. This definition covers equally the wire-like reinforcer elements of circular section and the wire-like reinforcer elements of non-circular section, for example of polygonal or oblong section. In the case of wire-like reinforcer elements of non-circular section, the ratio of the greatest dimension D of the section to the smallest dimension d of the section is greater than or equal to 20, preferably greater than or equal to 30 and more preferentially greater than or equal to 50.

Textile is understood to mean that the wire-like element is not metallic. In other words, the wire-like element consists of one or more non-metallic materials. Examples of such non-metallic materials are organic materials, notably the polymeric materials, and the mineral materials such as carbon or glass.

In the description and the claims, any interval of values designated by the expression "between a and b" represents the range of values going from more than a to less than b (that is to say excluding the bounds a and b) whereas any interval of values designated by the expression "from a to b" means the range of values going from the bound "a" to the bound "b", that is to say including the strict bounds "a" and "b".

The expression "part by weight for one hundred parts by weight of elastomer" (or pce) should be understood to mean, in the sense of the present invention, the part by weight for one hundred parts by weight of elastomer.

Axial direction is understood to mean the direction substantially parallel to the axis of rotation of the tyre.

Circumferential direction is understood to mean the direction which is substantially at right angles to both the axial direction and to a radius of the tyre (in other words, tangent to a circle whose centre is on the axis of rotation of the tyre).

Radial direction is understood to mean the direction along a radius of the tyre, that is to say any direction intersecting the axis of rotation of the tyre and substantially at right angles to that axis.

Median plane (denoted M) is understood to mean the plane at right angles to the axis of rotation of the tyre which is situated mid-way between the two beads and which passes through the middle of the crown reinforcement.

Equatorial circumferential plane (denoted E) is understood to mean the theoretical plane passing through the equator of the tyre, at right angles to the median plane and to the radial direction. The equator of the tyre is, in a circumferential cutting plane (plane at right angles to the circumferential direction and parallel to the radial and axial directions), the axis parallel to the axis of rotation of the tyre and situated equidistant between the radially outermost point of the tread intended to be in contact with the ground and the radially innermost point of the tyre intended to be in contact with a support, for example a rim, the distance between these two points being equal to H.

The measurements of the torsions N1, N1' and N2 can be performed by any method known to the person skilled in the art, for example in accordance with the ASTM standard D 885/D 885M-10a of 2014 (paragraph 30), for example using a torsiometer.

The count (or linear density) of each strand is determined according to the ASTM standard D 885/D 885M-10a of 2014. The count is given in tex (weight in grams of 1000 m of product—recap: 0, 111 tex equal to 1 denier).

The tangent modulus, expressed in cN/tex/%, is calculated from a force-elongation curve obtained by applying the standard ASTM D 885/D 885M-10a of 2014. From this force-elongation curve, the tangent modulus is deduced by calculating the derivative of the curve at each point. In the case of the bonded textile wire-like reinforcer element, the tangent modulus is measured directly before the step of embedding of the textile wire-like hoop reinforcer element in the hooping ply, that is to say without any other step modifying the tangent modulus properties taking place between its last heat treatment step and the embedding step. The tangent modulus measured before the step of production of the hooping ply is thus measured after one or more steps of coating of a raw textile wire-like reinforcer element with one or more layers of one or more thermoreticulable adhesive compounds and after one or more steps of heat treatment of the raw textile wire-like reinforcer element coated with one or more layers so as to crosslink the adhesive compound or compounds to obtain the bonded textile wire-like reinforcer element.

A raw textile wire-like element is such that the textile material or materials that make up the textile wire-like element are obtained from production without any coating having an adhesive function covering this material or these materials. Thus, a raw textile wire-like element can be bare, that is to say that the textile material or materials that make up the textile wire-like element are not coated with any coating or else possibly batched, that is to say coated with a batching compound whose functions are notably to facilitate the slip of the textile material or materials that make up the textile wire-like element during its production process and avoid the build-up of electrostatic charges.

Thus, in a first embodiment, the first strand of the core and the second strands of the layer are assembled to form the raw textile wire-like reinforcer element, the raw textile wire-like reinforcer element is coated with an outer layer of a thermoreticulable adhesive compound and the raw textile wire-like reinforcer element coated with the outer layer is heat treated so as to crosslink the adhesive compound to obtain the bonded textile wire-like reinforcer element.

In a second embodiment, the raw textile wire-like reinforcer element is coated with an intermediate layer of a first thermoreticulable adhesive compound, the raw textile wire-like reinforcer element coated with the intermediate layer is heat treated so as to crosslink the first adhesive compound to obtain a pre-bonded textile wire-like reinforcer element, the pre-bonded textile wire-like reinforcer element is coated with an outer layer of a second thermoreticulable adhesive compound and the pre-bonded textile wire-like reinforcer element coated with the outer layer is heat treated so as to crosslink the second adhesive compound to obtain the bonded textile wire-like reinforcer element.

The elongation at break and the breaking force of a textile wire-like element are measured according to the standard ASTM D 885/D 885M-10a of 2014. The elongation at break of a ply is equal to the elongation at break of the textile wire-like elements that it comprises.

Ply is understood to mean the assembly, on the one hand, of one or more wire-like reinforcer elements and, on the other hand, of an elastomeric matrix, the wire-like reinforcer element or elements being embedded in the elastomeric matrix.

The tensile secant modulus of a ply for a force equal to 15% of the breaking force is denoted $MA_{15}$ and is expressed in daN/mm. The modulus $MA_{15}$ is calculated from a force-elongation curve obtained by applying the standard ASTM D 885/D 885M-10a of 2014 to a textile wire-like reinforcer element of the ply. The tensile secant modulus of the textile wire-like reinforcer element is calculated by determining the slope of the straight line plotted between the points (0,0) and the point of the curve having an ordinate equal to 15% of the breaking force. The modulus $MA_{15}$ is determined by multiplying the tensile secant modulus of the textile wire-like reinforcer element by the number of textile wire-like reinforcer elements per mm of ply, this number being determined in a direction at right angles to the direction in which the textile wire-like reinforcer elements extend in the ply.

The breaking force of a ply is calculated from a force-elongation curve obtained by applying the standard ASTM D 885/D 885M-10a of 2014 to a textile wire-like reinforcer element of the ply. The breaking force of the ply is determined by multiplying the breaking force of the textile wire-like reinforcer element by the number of textile wire-like reinforcer elements per mm of ply, this number being determined in a direction at right angles to the direction in which the textile wire-like reinforcer elements extend in the ply.

The orientation of an angle is understood to be the direction, clockwise or anticlockwise, in which it is necessary to turn from a reference straight line, here the circumferential direction of the tyre, defining the angle to reach the other straight line defining the angle.

The tensile stiffness at 1% elongation of a strand is calculated from a force-elongation curve obtained by applying the standard ASTM D 885/D 885M-10a of 2014 to the strand to which a torsion of 100 turns/metre is applied. The tensile stiffness of the strand is calculated by determining the slope of the straight line plotted between the point of the curve corresponding to a force equal to the standard pretension of 0.5 cN/tex and the point of the curve having an abscissa equal to 1% of elongation.

Advantageously, the hooping reinforcement comprises a single hooping ply. Advantageously, the hooping reinforcement comprises a single hooping ply. Thus, the hooping reinforcement, apart from the hooping ply, has no ply reinforced by wire-like reinforcer elements. The wire-like reinforcer elements of such reinforced plies excluded from the hooping reinforcement of the tyre comprise metallic wire-like reinforcer elements and textile wire-like reinforcer elements. Very preferentially, the hooping reinforcement consists of a hooping ply.

In preferred embodiments, the or each textile wire-like hoop reinforcer element forms an angle less than or equal to 7° and more preferentially less than or equal to 5° with the circumferential direction of the tyre.

In a first embodiment, the hooping ply advantageously has a tensile secant modulus greater than or equal to 200 daN/mm for a force equal to 15% of the breaking force of the hooping ply. In a second embodiment, the hooping ply advantageously has a tensile secant modulus greater than or equal to 500 daN/mm for a force equal to 15% of the breaking force of the hooping ply.

In the first embodiment, the hooping ply advantageously has a tensile secant modulus less than or equal to 500 daN/mm for a force equal to 15% of the breaking force of the hooping ply. In the second embodiment, the hooping ply advantageously has a tensile secant modulus less than or equal to 800 daN/mm for a force equal to 15% of the breaking force of the hooping ply.

Advantageously, the breaking force of the hooping ply is greater than or equal to 35 daN/mm, preferably greater than or equal to 45 daN/mm and more preferentially greater than or equal to 55 daN/mm. In the second embodiment, the breaking force of the hooping ply is advantageously greater than or equal to 60 daN/mm, preferably greater than or equal to 70 daN/mm.

Advantageously, the or each bonded textile wire-like reinforcer element has, before the step of production of the hooping ply, a tangent modulus less than or equal to 3 cN/tex/% for any elongation less than or equal to 2%.

Advantageously, the or each bonded textile wire-like reinforcer element has, before the step of production of the hooping ply, a tangent modulus less than or equal to 10 cN/tex/% for any elongation less than or equal to 5%.

Advantageously, the or each bonded textile wire-like reinforcer element has, before the step of production of the hooping ply, a tangent modulus less than or equal to 15 cN/tex/% for any elongation less than or equal to 6%.

By virtue of the properties defined above, the or each bonded textile wire-like reinforcer element has, before the step of production of the hooping ply, a force-elongation curve having a relatively small modulus at small elongations. Such a tyre allows, by virtue of a relatively low tangent modulus of the raw bonded textile wire-like element or elements, that is to say before the step of production of the hooping ply, an easy radial and circumferential deformation of the tyre during its production method.

Advantageously, the or each textile wire-like hoop reinforcer element has, once extracted from the tyre, a tangent modulus greater than or equal to 5 cN/tex/% for any elongation greater than or equal to 3.5%, preferably greater than or equal to 3% and more preferentially greater than or equal to 2%. Thus, the hooping reinforcement has a high modulus for very small elongations and makes it possible to very rapidly take up significant loads. That makes it possible to lighten all the more the rest of the crown reinforcement of the tyre, notably using the means described previously.

Advantageously, the or each textile wire-like hoop reinforcer element has, once extracted from the tyre, a tangent modulus greater than or equal to 10 cN/tex/% for any elongation greater than or equal to 6%, preferably greater than or equal to 5% and more preferentially greater than or equal to 4%.

Advantageously, the or each textile wire-like hoop reinforcer element has, once extracted from the tyre, a tangent modulus greater than or equal to 15 cN/tex/% for any elongation greater than or equal to 8%, preferably greater than or equal to 7% and more preferentially greater than or equal to 6%.

Advantageously, the or each textile wire-like hoop reinforcer element has, once extracted from the tyre, a tangent modulus greater than or equal to 20 cN/tex/% for any elongation greater than or equal to 8%.

Similarly, for greater elongations, the hooping reinforcement has a relatively high, even very high, modulus, making it possible to smoothly lighten the crown reinforcement of the tyre without risking damaging the mechanical properties thereof.

Advantageously, the or each textile wire-like hoop reinforcer element has, once extracted from the tyre, an elongation at break greater than or equal to 6%, preferably greater than or equal to 7% and more preferentially greater than or equal to 8%. Thus, the or each textile wire-like hoop reinforcer element has an elongation at break that is sufficiently high to absorb the deformations undergone by the crown reinforcement while the tyre is rolling, even in severe conditions. Similarly, the hooping ply has, once extracted from the tyre, an elongation at break greater than or equal to 6%, preferably greater than or equal to 7% and more preferentially greater than or equal to 8%.

Advantageously, the or each bonded textile wire-like reinforcer element has, before the step of production of the hooping ply, an elongation at break greater than or equal to 10%.

Two preferred embodiments of the invention will now be described. In a first embodiment, the deformability of the bonded textile wire-like element is maximized and therefore the radial and circumferential deformability of the tyre in its production method is maximized. In a second embodiment, the deformability is favoured in the trade-off between deformability and modulus and therefore the radial and circumferential deformability of the tyre in its production method is favoured in the trade-off between radial and circumferential deformability of the tyre and mechanical strength of the crown.

First Embodiment of the Invention

Advantageously, the or each bonded textile wire-like reinforcer element has, before the step of production of the hooping ply, a tangent modulus less than or equal to 3 cN/tex/% for any elongation less than or equal to 6%, preferably for any elongation less than or equal to 7%, more preferentially for any elongation less than or equal to 8% and even more preferentially for any elongation less than or equal to 9%.

Advantageously, the or each bonded textile wire-like reinforcer element has, before the step of production of the hooping ply, a tangent modulus less than or equal to 5 cN/tex/% for any elongation less than or equal to 7.5%, preferably for any elongation less than or equal to 8.5%, more preferentially for any elongation less than or equal to 9.5% and even more preferentially for any elongation less than or equal to 10.5%.

Advantageously, the or each bonded textile wire-like reinforcer element has, before the step of production of the hooping ply, a tangent modulus less than or equal to 10 cN/tex/% for any elongation less than or equal to 10%, preferably for any elongation less than or equal to 11%, more preferentially for any elongation less than or equal to 12% and even more preferentially for any elongation less than or equal to 13%.

Advantageously, the or each bonded textile wire-like reinforcer element has, before the step of production of the hooping ply, a tangent modulus less than or equal to 15 cN/tex/% for any elongation less than or equal to 12%, preferably for any elongation less than or equal to 13%, more preferentially for any elongation less than or equal to 14% and even more preferentially for any elongation less than or equal to 15%.

Over a relatively large range of elongations, the bonded textile wire-like reinforcer element has a relatively low tangent modulus allowing for an easy radial and circumferential deformation of the tyre in its production method. Thus, for a relatively large range of elongations, the bonded textile wire-like reinforcer element and therefore the hooping ply develop a relatively low effort which reduces, when the textile wire-like hoop reinforcer element is tensioned, the risks of penetration of the or each textile wire-like hoop reinforcer element in the plies which are radially internal to the hooping reinforcement and the risks of variation of the geometry obtained for the tyre compared to the expected geometry of the tyre. Thus, advantageously, if so desired, it is possible to reduce the pressure applied inside the tyre during baking.

Advantageously, the or each bonded textile wire-like reinforcer element has, before the step of production of the hooping ply, an elongation at break greater than or equal to 14%, preferably greater than or equal to 15%, more preferentially greater than or equal to 16% and even more preferentially greater than or equal to 17%.

Second Embodiment of the Invention

Advantageously, the or each bonded textile wire-like reinforcer element has, before the step of production of the hooping ply, a tangent modulus greater than or equal to 3 cN/tex/% for any elongation greater than or equal to 6%, preferably for any elongation greater than or equal to 5%, more preferentially for any elongation greater than or equal to 4% and even more preferentially for any elongation greater than or equal to 3%.

Advantageously, the or each bonded textile wire-like reinforcer element has, before the step of production of the hooping ply, a tangent modulus greater than or equal to 5 cN/tex/% for any elongation greater than or equal to 7.5%, preferably for any elongation greater than or equal to 6.5%, more preferentially for any elongation greater than or equal to 5.5% and even more preferentially for any elongation greater than or equal to 4.5%.

Advantageously, the or each bonded textile wire-like reinforcer element has, before the step of production of the hooping ply, a tangent modulus greater than or equal to 10 cN/tex/% for any elongation greater than or equal to 10%, preferably for any elongation greater than or equal to 8.5%, more preferentially for any elongation greater than or equal to 7.5% and even more preferentially for any elongation greater than or equal to 6.5%.

Advantageously, the or each bonded textile wire-like reinforcer element has, before the step of production of the hooping ply, a tangent modulus greater than or equal to 15 cN/tex/% for any elongation greater than or equal to 12%, preferably for any elongation greater than or equal to 10.5%, more preferentially for any elongation greater than or equal to 9% and even more preferentially for any elongation greater than or equal to 7.5%.

Since the modulus of each bonded textile wire-like reinforcing element is relatively high in the tyre production method, the risks of collapse of the crown of the tyre in its handling are limited. Indeed, the relatively high modulus confers a more than sufficient rigidity on the crown reinforcement of the tyre to withstand, in the raw state, its own weight and that of the tread, and thus reduce the risks of radial collapse of the crown on itself. Nevertheless, this rigidity is sufficiently low to allow a radial and circumferential deformability of the tyre.

Finally, as in the tyre production method, the elongation of each bonded textile wire-like reinforcing element is partially taken up, the modulus of each textile wire-like hoop reinforcer element once extracted from the tyre for relatively low elongations corresponds to the modulus of each bonded textile wire-like reinforcer element before the step of production of the hooping ply for higher elongations. Consequently, the modulus of each textile wire-like hoop reinforcer element once extracted from the tyre is relatively high, which leads also to a relatively high breaking force, to the point of guaranteeing good properties of mechanical strength of the hooping ply.

Advantageously, the or each bonded textile wire-like reinforcer element has, before the step of production of the hooping ply, an elongation at break less than or equal to 14%, preferably less than or equal to 13%, more preferentially less than or equal to 12% and even more preferentially less than or equal to 11%.

Other Preferred Embodiments of the Invention

In one particularly preferred embodiment, the or each textile wire-like hoop reinforcer element comprises:
- a core composed of a first strand comprising at least one monofilament, and
- a layer comprising at least two second strands, each second strand of the layer comprising at least one monofilament, each second strand of the layer being helically wound around the core.

Such a textile wire-like hoop reinforcer element is commonly referred to as "core insertion". Thus, the central core is inserted in the middle of the second strands of the layer which are therefore peripheral and adjacent to it. Each second strand of the layer is wound around the core without being wound around the other second strand or strands of the layer.

Such a structure of the textile wire-like hoop reinforcer element makes it possible to obtain the desired mechanical properties of the textile wire-like hoop reinforcer element before the step of production of the ply and once extracted from the tyre. Indeed, when the textile wire-like hoop reinforcer element is stressed to low elongations, the modulus of the textile wire-like hoop reinforcer element remains relatively low, said modulus being then governed by the core composed of a single first strand. Since the second strands of the layer are helically wound, they do not contribute to increasing the value of the modulus with low elongations because the effort is absorbed by the geometric deformation of the helix. When the textile wire-like hoop reinforcer element is stressed to greater elongations, the helix of the second strands of the layer having been consumed at least in part by the elongation, said second strands contribute greatly to the increasing of the modulus in addition to the contribution of the core.

Also, such a structure of the textile wire-like hoop reinforcer element makes it possible to obtain an endurance that is much greater than that of a conventional hybrid textile wire-like element as described in WO2016/166056. Indeed, the textile wire-like element of "core insertion" type as described above offers excellent endurance. The inventors promote the assumption that, when a conventional hybrid textile wire-like element as described in WO2016/166056 is compressed, the aramid monofilaments are damaged and see their breaking force decrease so that, under the effect of repeated stresses, notably in the event of subsequent tensioning, the risk of breaking is significantly increased relative to before the compression thereof. When a textile wire-like element of "core insertion" type is compressed as described above, the monofilament or monofilaments which undergo the greatest compression are those of the core, monofilaments which, if they are shrewdly chosen, have a less oriented molecular structure conferring upon them a good resistance to compression stresses. Furthermore, when a textile wire-like element of "core insertion" type is compressed as described above, the monofilament or monofilaments of the layer strands have more degrees of freedom available compared to the aramid monofilaments of a conventional hybrid textile wire-like element as described in WO2016/166056. Thus, the monofilament or monofilaments of the layer strands are arranged so as to adapt to the mechanical stress in such a way that they are damaged less and retain a higher breaking force, allowing them to break less easily under the effect of the repeated stresses of the textile wire-like element.

Preferably, the sum of the stiffnesses in tension at 1% elongation of the second strands, designated Sc, is greater than the stiffness in tension at 1% elongation of the first strand, designated Sa, preferably Sc/Sa≥10, more preferentially Sc/Sa≥50 and even more preferentially Sc/Sa≥100. As the stiffness of the layer is relatively high, the textile wire-like hoop reinforcer element then has a significantly higher stiffness at great elongations than at small elongations.

In this embodiment, and those which follow, it is possible to obtain a bi-modulus behaviour suited to the force-elongation curve of the textile wire-like reinforcer element through a shrewd choice of stiffnesses and therefore of moduluses of the first and second strands, the difference in stiffnesses and therefore in moduluses between the core and the layer being exacerbated by the "core insertion" structure as explained hereinabove.

Advantageously, the first strand has a secant modulus in tension at 1% elongation less than or equal to 2500 cN/tex, preferably less than or equal to 900 cN/tex and more preferentially less than or equal to 500 cN/tex.

Advantageously, each second strand has a secant modulus in tension at 1% elongation greater than or equal to 500 cN/tex, preferably greater than or equal to 1000 cN/tex and more preferentially greater than or equal to 2200 cN/tex.

Thus, the textile wire-like hoop reinforcer element has a force-elongation curve with a relatively low modulus at small elongations and a relatively high modulus at great elongations by virtue of the relatively different moduluses in tension of the first and second strands.

In one embodiment, the first strand comprises a single monofilament. In a preferred embodiment, the first strand is a multifilament strand comprising several monofilaments.

In one embodiment, each second strand comprises a single monofilament. In a preferred embodiment, each second strand is a multifilament strand comprising several monofilaments.

A monofilament is produced in a given material and designates a monolithic filament obtained, for example from the extrusion of this material, for example by molten extrusion, extrusion in solution or gel extrusion.

In the case of a strand comprising a single monofilament, the monofilament typically has a diameter ranging from 0.03 mm to 0.50 mm.

In the case of a multifilament strand comprising several monofilaments, the monofilaments typically have diameters ranging from 2 to 30 µm. Each multifilament strand of monofilaments comprises at least two elementary filaments, typically more than 10 elementary filaments, preferably more than 100 elementary filaments and more preferentially more than 500 elementary filaments.

In the embodiments described above, each monofilament can be produced from one or more materials in order to form a monolithic filament. Preferably, and for industrial cost reasons, each monofilament is produced in a single textile material.

In an advantageous embodiment, the monofilament or monofilaments of the first strand is or are produced from a material chosen from among the polyesters, the aliphatic polyamides, the celluloses and the mixes of monofilaments of these materials, preferably produced from a material chosen from among the aliphatic polyamides and more preferentially made of nylon 6.6. The aliphatic polyamides and notably nylon 6.6 have a molecular structure that is not very oriented conferring upon them a good resistance to compression stresses, a quality sought for the core of the textile wire-like hoop reinforcer element, notably to improve its endurance.

In an advantageous embodiment, the monofilament or monofilaments of each second strand is or are produced from a material chosen from among the aromatic polyamides, the aromatic copolyamides, the polyketones and the mixes of monofilaments of these materials, preferably produced from a material chosen from among the aromatic polyamides and more preferentially made of para-aramid. The aromatic polyamides and notably para-aramid offer excellent tenacity conferring upon them a good breaking force, a quality that is sought for the layer of the textile wire-like hoop reinforcer element.

In the above embodiments, mixes of monofilaments of these materials should be understood to mean multifilament strands comprising a mix of monofilaments produced from different materials. Such multifilament strands are notably described in WO2009052844.

To recap, as is known, a monofilament of aromatic polyamide or aromatic copolyamides is a monofilament of linear macromolecules formed by aromatic groups bonded to one another by amide bonds, at least 85% of which are directly bound to two aromatic kernels, and more particularly kernels of fibres of poly (p-phenylene terephthalamide) (or PPTA), manufactured for a very long time from optically anisotropic extruding compounds. The aromatic polyamides or aromatic copolyamides that can be cited include the polyarylamides (or PAA, notably known by the trade name Ixef from the company Solvay), poly(metaxylylene adipamide), the polyphthalamides (or PPA, notably known by the trade name Amodel from the company Solvay), the amorphous semi-aromatic polyamides (or PA 6-3T, notably known by the trade name Trogamid from the company Evonik), the para-aramids (or poly(paraphenylene terephthalamide or PA PPD-T, notably known by the trade name Kevlar from the company Du Pont de Nemours or Twaron from the company Teijin).

Monofilament of polyketone is understood to be a monofilament of thermoplastic polymer obtained by polycondensation of ethylene and of carbon monoxide. The filaments of polyketone are, for their part, also described in a very large number of publications, for example EP 310 171, EP 456 306, EP 1 925 467, WO 2002/068738 or U.S. Pat. No. 6,818,728, US 2007/0017620, US 2009/0266462. Examples that can be cited are Karilon from the company Hyosung, Akrotek from the company Akro-Plastic or Schulaketon from the company Schulman.

To recap, a monofilament of polyester is a monofilament of linear macromolecules formed by groups bound to one another by ester bonds. The polyesters are manufactured by polycondensation through esterification between a carboxylic diacid or one of its derivatives and a diol. For example, polyethylene terephthalate can be manufactured by polycondensation of terephthalic acid and of ethylene glycol. The known polyesters that can be cited include polyethylene terephthalate (PET), polyethylene naphthalate (PEN), polybutylene terephthalate (PBT), polybutylene naphthalate (PBN), polypropylene terephthalate (PPT) or polypropylene naphthalate (PPN).

A monofilament of aliphatic polyamide is understood to be a monofilament of linear macromolecules of polymers or copolymers containing amide functions not exhibiting aromatic cycles and that can be synthesized by polycondensation between a carboxylic acid and an amine. The aliphatic polyamides that can be cited include the nylons PA4.6, PA6, PA6.6 or even PA6.10, and notably Zytel from the company DuPont, Technyl from the company Solvay or Rilsamid from the company Arkema.

A monofilament of cellulose is understood to be a monofilament made of a cellulosic material, that is to say based on cellulose, on a cellulosic derivative or on cellulose regenerated from a cellulosic derivative, regardless of the extrusion method of course. "Cellulosic derivative" should be understood to be any compound formed, following chemical reactions, by substitution of the hydroxyl groups of the cellulose, this derivative being also called substitution derivative. As is also known, "regenerated cellulose" is understood to be a cellulose obtained by a regeneration process performed on a cellulosic derivative. Examples of cellulosic fibres that can be cited are for example the rayon or viscous fibres marketed by the company Cordenka or the "Lyocell" fibres marketed by the company Hyosung. The fibres with high cellulose formiate modulus or those made of regenerated cellulose as described in the applications WO 85/05115 or WO 97/06294 can also be cited.

Thus, in a preferred embodiment, the first strand of the core comprises at least one monofilament produced in an aliphatic polyamide, preferably made of nylon 6.6. Preferably, the first strand is a multifilament strand comprising several monofilaments produced in an aliphatic polyamide, preferably made of nylon 6.6. The inventors have discovered that the constituent material of the core significantly influenced compression endurance of the textile wire-like element. Indeed, by being at the centre of the textile wire-like element and therefore without helix, the material of the core is immediately stressed when the textile wire-like element is axially compressed. With the aliphatic polyamides having an improved compression endurance compared to the polyesters, the inventors thus obtained a textile wire-like reinforcer element with great compression endurance.

In a preferred embodiment, each second strand of the layer comprises at least one monofilament produced in an aromatic polyamide, preferably made of para-aramid. Preferably, each second strand of the layer is a multifilament strand comprising several monofilaments produced in an aromatic polyamide, preferably made of para-aramid. The inventors have discovered that, for weak stresses and therefore low elongations, the second layer strands, through their helix, have little influence on the modulus because the constituent material of the monofilaments of the second layer strands is not stressed. For strong stresses and therefore high elongations, the elongation undergone by the helix having been taken up by the stress, the constituent material of the monofilaments of the second layer strands is then stressed. Because of the selection of an aromatic polyamide which has excellent tenacity, the modulus of the reinforcer element is then maximized for these strong stresses without excessively increasing the modulus of the reinforcer element for the smaller elongations.

In one embodiment, the layer is composed of three or four second strands, preferably three second strands. Thus, the outer surface of the core is easily entirely covered. Three second strands are preferentially used so as to delimit the diameter of the or each textile wire-like hoop reinforcer element.

Advantageously, the twist factor of the first strand of the core goes from 60 to 80, preferably from 65 to 75. Advantageously, the twist factor of each second strand of the layer goes from 90 to 120, preferably from 100 to 115.

The twist factor of a strand is equal to $R \times (T/(1000 \times \rho))^{(1/2)}$, a relationship in which R is the twist of the strand in turns per metre before its assembly within the textile wire-like hoop reinforcer element, T is the count of the strand in tex and ρ is the density of the constituent material of the monofilament or monofilaments of the strand.

Advantageously, the twist factor of the textile wire-like hoop reinforcer element goes from 170 to 220, preferably from 180 to 210.

The twist factor of the textile wire-like hoop reinforcer element is equal to $R' \times (T'/(1000 \times \rho'))^{(1/2)}$, a relationship in which R' is the twist of the textile wire-like hoop reinforcer element in turns per metre, T' is the count of the textile wire-like hoop reinforcer element in tex and ρ' is the density of the constituent materials of the monofilament or monofilaments of the textile wire-like hoop reinforcer element. In the case of different materials, the count is obtained by taking an average of the counts of the strands weighted by the number strands. In the case of different materials, the density is obtained by taking an average of the densities weighted by the number of strands and the count of each strand.

In a first variant of the core, the first strand of the core is composed of a spun yarn, the spun yarn comprising at least one monofilament, preferably the spun yarn comprising several monofilaments. In this first variant, the prior steps of assembly of several spun yarns to manufacture the strand of the core are avoided.

In a second variant of the core, the first strand of the core comprises an assembly comprising at least two distinct spun yarns, each spun yarn comprising at least one monofilament, preferably each spun yarn comprising several monofilaments.

Advantageously, the count of the first strand of the core goes from 10 tex to 100 tex, preferably from 40 tex to 60 tex. The count of the strand is understood to be the sum of the counts of the constituent spun yarn or yarns of the first strand of the core. Thus, in the first variant of the core, the count of the spun yarn goes from 10 tex to 100 tex, preferably from 40 tex to 60 tex. In the second variant of the core, in the case of two spun yarns forming the first strand of the core, the count of each spun yarn goes from 5 tex to 50 tex, preferably from 20 tex to 30 tex.

In a first variant of the layer, each second strand of the layer is composed of a spun yarn, the spun yarn comprising at least one monofilament, preferably the spun yarn comprising several monofilaments. In this first variant, the prior steps of assembly of several spun yarns to manufacture each strand of the layer are avoided.

In a second variant of the layer, each second strand of the layer comprises an assembly comprising at least two distinct spun yarns, each spun yarn comprising at least one monofilament, preferably each spun yarn comprising several monofilaments.

Advantageously, the count of each second strand of the layer goes from 50 tex to 350 tex, preferably from 130 tex to 220 tex. The count of the strand is understood to be the sum of the counts of the constituent spun yarn or yarns of each second strand of the layer. Thus, in the first variant of the layer, the count of the spun yarn goes from 50 tex to 350 tex, preferably from 130 tex to 220 tex. In the second variant of the layer, in the case of two spun yarns forming each second strand of the layer, the count of each spun yarn goes from 25 tex to 175 tex, preferably from 65 tex to 110 tex.

Advantageously, the ratio of the count of the first strand of the core to the sum of the counts of the second strands of the layer goes from 0.05 to 0.15. In this way, there is an assurance that the core is sufficiently covered by the layer, in other words that the first strand of the core is fully contained inside a space delimited by the layer.

In one embodiment, the or each textile wire-like hoop reinforcer element is obtained by a method comprising:
- a step of twisting of the first strand of the core according to a number of turns per metre N1 in a first twisting direction,
- a step of twisting of each second strand of the layer according to a number of turns per metre N1' in the first twisting direction,
- a step of assembly by twisting of the first strand of the core and of the second strands of the layer according to a number of turns per metre N2 in a second twisting direction opposite to the first twisting direction.

Preferably, N1>N1' and N2=N1'. Because of the geometry of the textile wire-like hoop reinforcer element, the core requires less untwisting in the second direction to have a zero residual twist of its monofilaments whereas the layer requires a substantially equal untwisting in the second direction to have a zero residual twist. Advantageously, $1.02 \leq N1/N1' \leq 1.15$, preferably $1.05 \leq N1/N1' \leq 1.10$.

In order to obtain the best trade-off between breaking force and endurance of the textile wire-like reinforcer element having the counts defined above:
- N1 goes from 300 to 380 turns per metre, preferably from 320 to 360 turns per metre,
- N1' goes from 275 to 355 turns per metre, preferably from 295 to 335 turns per metre, and
- N2 goes from 275 to 355 turns per metre, preferably from 295 to 335 turns per metre.

Advantageously, the tyre comprises a crown comprising a tread, two side walls, two beads, each side wall linking each bead to the crown, the crown reinforcement extending in the crown in a circumferential direction of the tyre.

Advantageously, the tyre comprises a carcass reinforcement anchored in each of the beads and extending in the side walls and in the crown, the crown reinforcement being radially inserted between the carcass reinforcement and the tread.

According to one embodiment, the carcass reinforcement comprises a single carcass ply. Thus, the carcass reinforcement, apart from the carcass ply, has no ply reinforced by wire-like reinforcer elements. The wire-like reinforcer elements of such reinforced plies excluded from the carcass reinforcement of the tyre comprise the metallic wire-like reinforcer elements and the textile wire-like reinforcer elements. Very preferentially, the carcass reinforcement consists of a carcass ply.

Preferably, the single carcass ply comprises wire-like carcass reinforcer elements.

In one embodiment, each wire-like carcass reinforcer element forms an angle $A_{C1}$ greater than or equal to 55°, preferably ranging from 55° to 80° and more preferentially ranging from 60° to 70°, with the circumferential direction of the tyre in the median plane of the tyre. Thus, the wire-like carcass reinforcer elements, through the angle formed with the circumferential direction, participate in the formation of the triangular mesh in the crown of the tyre.

In one embodiment, each wire-like carcass reinforcer element forms an angle Ace greater than or equal to 85° with the circumferential direction of the tyre in the equatorial circumferential plane of the tyre. The wire-like carcass reinforcer elements are substantially radial in each side wall, that is to say substantially at right angles to the circumferential direction, which makes it possible to retain all the advantages of a tyre with radial carcass.

According to a particularly advantageous embodiment, the crown reinforcement comprises a working reinforcement comprising a single working ply. Thus, the working reinforcement, apart from the working ply, has no ply reinforced by wire-like reinforcer elements. The wire-like reinforcer elements of such reinforced plies excluded from the working reinforcement of the tyre comprise the metallic wire-like reinforcer elements and the textile wire-like reinforcer elements. Very preferentially, the working reinforcement consists of a working ply. The properties of mechanical strength and of endurance of the hooping reinforcement previously described make it possible to advantageously eliminate a working ply from the working reinforcement. A significantly lightened tyre is obtained.

In one embodiment, the hooping reinforcement is radially inserted between the working reinforcement and the tread. As a variant, the hooping reinforcement could be radially inserted between the working reinforcement and the carcass reinforcement.

Preferably, the single working ply comprises wire-like working reinforcer elements.

In one embodiment, each wire-like working reinforcer element forms an angle $A_T$ greater than or equal to 10°, preferably ranging from 30° to 50° and more preferentially from 35° to 45° with the circumferential direction of the tyre in the median plane of the tyre. Thus, the wire-like working reinforcer elements, through the angle formed with the circumferential direction, participate in the formation of the triangular mesh in the crown of the tyre.

Advantageously, the textile wire-like hoop reinforcer element or elements, the wire-like working reinforcer elements and the wire-like carcass reinforcer elements are arranged so as to define, in projection on the equatorial circumferential plane, a triangular mesh. Such a mesh makes it possible to obtain properties similar to those of a conventional tyre of the state of the art comprising a hooping ply, two working plies and a carcass ply.

In order to form the most effective possible triangular mesh, the orientation of the angle $A_T$ and the orientation of the angle $A_{C1}$ are preferentially opposite relative to the circumferential direction of the tyre.

In the tyre described, the crown comprises the tread and the crown reinforcement. A tread is understood to be a band of polymeric material, preferably elastomeric, delimited:

radially outwards, by a surface intended to be in contact with a ground, and radially inwards, by the crown reinforcement.

The band of polymeric material is composed of a ply of a polymeric material, preferably elastomeric, or else composed of a stack of several plies, each ply consisting of a polymeric material, preferably elastomeric.

In a very preferential embodiment, the crown reinforcement comprises a single hooping reinforcement and a single working reinforcement. Thus, the crown reinforcement, apart from the hooping reinforcement and the working reinforcement, has no reinforcement reinforced by reinforcer elements. The reinforcer elements of such reinforcements excluded from the crown reinforcement of the tyre comprise wire-like reinforcer elements, knits or even fabrics. Very preferentially, the crown reinforcement consists of the hooping reinforcement and the working reinforcement.

In a very preferential embodiment, the crown, apart from the crown reinforcement, has no reinforcement reinforced by reinforcer elements. The reinforcer elements of such reinforcements excluded from the crown of the tyre comprise wire-like reinforcer elements, knits or even fabrics. Very preferentially, the crown consists of the tread and the crown reinforcement.

In a very preferential embodiment, the carcass reinforcement is arranged directly radially in contact with the crown reinforcement and the crown reinforcement is arranged directly radially in contact with the tread. In this very preferential embodiment, the single hooping ply and the single working ply are advantageously arranged directly radially in contact with one another.

Directly radially in contact is understood to mean that the objects that are considered to be directly radially in contact with one another, here the plies, reinforcements or the tread, are not separated radially by any object, for example by any ply, reinforcement or band which would be interposed radially between the objects that are considered to be directly radially in contact with one another.

Advantageously, the wire-like reinforcer elements of each ply are embedded in an elastomeric matrix. The different plies can comprise the same elastomeric matrix or else distinct elastomeric matrices.

Elastomeric matrix is understood to mean a matrix having, in the crosslinked state, an elastomeric behaviour. Such a matrix is advantageously obtained by the crosslinking of a compound comprising at least one elastomer and at least one other component. Preferably, the compound comprising at least one elastomer and at least one other component comprises an elastomer, a crosslinking system and a filler.

Preferably, the elastomer is a dienic elastomer, that is to say, to recap, any elastomer (single elastomer or mix of elastomers) which is derived, at least partly (i.e. a homopolymer or a copolymer), from diene monomers, that is to say monomers with two double carbon-carbon bonds, whether the latter are conjugate or not. This dienic elastomer is chosen more preferentially from the group composed of the polybutadienes (BR), natural rubber (NR), the synthetic polyisoprenes (IR), the butadiene copolymers, the isoprene copolymers and the mixes of these elastomers, such copolymers being notably chosen from the group composed of the styrene-butadiene copolymers (SBR), the butadiene isoprene copolymers (BIR), the styrene-isoprene copolymers (SIR) and the styrene-butadiene-isoprene copolymers (SBIR). A particularly preferential embodiment consists in using an "isoprenoid" elastomer, that is to say a homopolymer or a copolymer of isoprene, in other words a dienic elastomer chosen from the group composed of natural rubber (NR), the synthetic polyisoprenes (IR), the different isoprene copolymers and the mixes of these elastomers.

Preferably, the crosslinking system for each compound is a so-called vulcanization system, that is to say based on sulpha (or on a sulpha-donating agent) and a primary vulcanization accelerator. To this basic vulcanization system can be added various secondary accelerators or known vulcanization activators. The sulpha is used at a preferential rate lying between 0.5 and 10 pce, the primary vulcanization accelerator, for example a sulfenamide, is used at a preferential rate lying between 0.5 and 10 pce. The reinforcing filler ratio, for example of carbon black and/or of silica, is preferably greater than 30 pce, notably lying between 30 and 100 pce. pce is understood to mean parts by weight per one hundred parts of elastomer.

For the carbon blacks, all the carbon blacks are suitable, notably the blacks of HAF, ISAF and SAF type conventionally used in tyres (so-called tyre grade blacks). Among the latter, those cited more particularly are the carbon blacks of (ASTM) grade 300, 600 or 700 (for example N326, N330, N347, N375, N683, N772). For the silicas, the precipitated or pyrogenic silicas that have a surface BET greater than 450 m2/g, preferably from 30 to 400 m2/g, are notably suitable.

The person skilled in the art, in light of the present description, will be able to adjust the formulation of the compounds in order to achieve the desired levels of properties (notably modulus of elasticity), and adapt the formulation to the specific application envisaged. Thus, each compound can comprise one or more dienic elastomers, also all or some of the additives usually used in the compounds intended for the manufacturing of tyres, such as, for example, reinforcing fillers like carbon black or silica, bonding agents, anti-ageing agents, antioxidants, plasticizing agents or extension oils, whether the latter be of aromatic or non-aromatic nature (notably oils that are very weakly or non-aromatic, for example of naphthenic or paraffinic type, with high, or preferably low, viscosity, MES or TDAE oils), plasticizing resins with high glass transition temperature (greater than 30° C.), agents facilitating the implementation (processability) of the compounds in the raw state, tackifying resins, anti-reversion agents, methylene acceptors and donors such as, for example, HMT (hexamethylenetetramine) or H3M (hexamethoxymethylmelamine), reinforcing resins, known adhesion promoting systems of the metal salts type for example, notably salts of cobalt, nickel or of lanthanide.

Preferably, each elastomeric matrix has an extension secant modulus, at 10% elongation, which lies between 4 and 25 MPa, more preferentially between 4 and 20 MPa; values lying notably between 5 and 15 MPa have proved particularly suitable. The modulus measurements are performed in tension mode, unless stipulated otherwise according to the standard ASTM D 412 of 1998 (specimen "C"): in second elongation (that is to say after an accommodation cycle) the "true" secant modulus (that is to say adjusted to the real section of the specimen) is measured at 10% elongation, here denoted Ms and expressed in MPa (normal conditions of temperature and relative humidity according to the standard ASTM D 1349 of 1999).

Advantageously, each wire-like working reinforcer element is metallic. Metallic wire-like element is understood to mean, by definition, a wire-like element formed by one or an assemblage of several wires consisting entirely (for 100% of the wires) of a metallic material. Such a metallic wire-like element is preferentially implemented with one or more of the wires made of steel, more preferentially of perlitic (or ferrito-perlitic) carbon steel, hereinafter designated "carbon steel", or even of stainless steel (by definition, steel comprising at least 11% chromium and at least 50% iron). However, it is of course possible to use other steels or other alloys. When a carbon steel is advantageously used, its carbon content (% by weight of steel) preferably lies between 0.2% and 1.2%, notably between 0.5% and 1.1%; these content values represent a good trade-off between the mechanical properties required for the tyre and the feasibility of the wires. The metal or the steel used, whether it be in particular a carbon steel or a stainless steel, can itself be coated with a metallic layer enhancing, for example, the implementation properties of the metallic cable and/or of its constituent elements, or the usage properties of the cable and/or of the tyre themselves, such as the properties of grip, of corrosion resistance or even of ageing resistance. According to a preferential embodiment, the steel used is covered with a layer of brass (Zn—Cu alloy) or of zinc.

The invention will be better understood on reading the following description, given purely as a nonlimiting example and given with reference to the drawings.

Example of A Tyre According to the Invention

In the figures, a reference frame X, Y, Z has been represented corresponding to the usual directions, respectively axial (X), radial (Y) and circumferential (Z), of a tyre.

FIG. 1 shows a tyre, according to the invention and designated with the general reference 10. The tyre 10 is substantially of revolution about an axis substantially parallel to the axial direction X. The tyre 10 is here intended for a private passenger vehicle.

The tyre 10 comprises a crown 12 comprising a tread 20 and a crown reinforcement 14 extending in the crown 12 in the circumferential direction Z. Here, the crown 12 consists of the tread 20 and the crown reinforcement 14.

The crown reinforcement 14 comprises a single working reinforcement 16 comprising a single working ply 18 and a single hooping reinforcement 17 comprising a single hooping ply 19. Here, the crown reinforcement consists of the working reinforcement 16 and the hooping reinforcement 19. Here, the working reinforcement 16 consists of the working ply 18 and the hooping reinforcement 17 consists of the hooping ply 19.

The crown reinforcement 14 is topped by the tread 20. Here, the hooping reinforcement 17, here the hooping ply 19, is radially inserted between the working reinforcement 16 and the tread 20.

The tyre 10 comprises two side walls 22 extending the crown 12 radially inwards. The tyre 10 further comprises two beads 24 radially internal to the side walls 22 and each comprising an annular reinforcing structure 26, in this particular case a bead wire 28, topped by a mass of packing rubber 30, and a radial carcass reinforcement 32. The crown reinforcement 14 is situated radially between the carcass reinforcement 32 and the tread 20. Each side wall 22 links each bead 24 to the crown 12.

The carcass reinforcement 32 comprises a single carcass ply 34. The carcass reinforcement 32 is anchored in each of the beads 24 by a turn-up around the bead wire 28 so as to form, in each bead 24, a go strand 38 extending from the beads 24 in the side walls 22 and in the crown 12, and a return strand 40, the radially outer end 42 of the return strand 40 being radially outside the annular reinforcing structure 26. The carcass reinforcement 32 thus extends from the beads 24 through the side walls 22 to the crown 12. In this embodiment, the carcass reinforcement 32 extends also axially through the crown 12. The crown reinforcement 14 is radially inserted between the carcass reinforcement 32 and the tread 20.

As a variant, the hooping reinforcement 17 could be radially inserted between the working reinforcement 16 and the carcass reinforcement 32.

Each working ply 18, hooping ply 19 and carcass ply 34 comprises an elastomeric matrix in which there are embedded one or more reinforcer elements of the corresponding ply.

Figure 2:
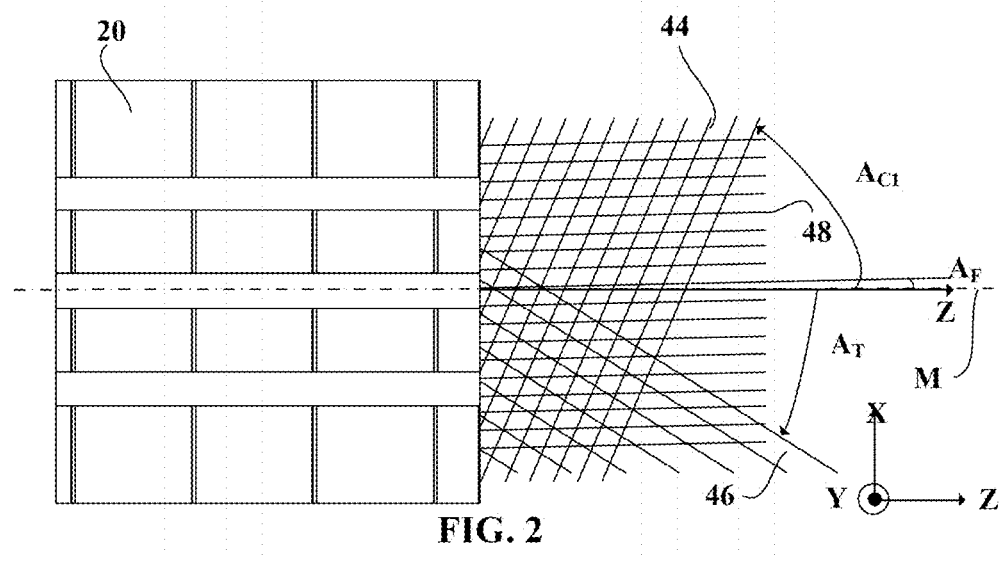
FIG. 2 is a cutaway view of the tyre of FIG. 1 illustrating the projection on the equatorial circumferential plane E of the textile wire-like hoop reinforcer elements, of the wire-like working reinforcer elements and of the wire-like carcass reinforcer elements.

Referring to FIG. 2, the single carcass ply 34 comprises wire-like carcass reinforcer elements 44. Each wire-like carcass reinforcer element 44 forms an angle $A_{C1}$ greater than or equal to 55°, preferably ranging from 55° to 80° and more preferentially from 60° to 70°, with the circumferential direction Z of the tyre 10 in the median plane M of the tyre 10, in other words in the crown 12.

Figure 3:
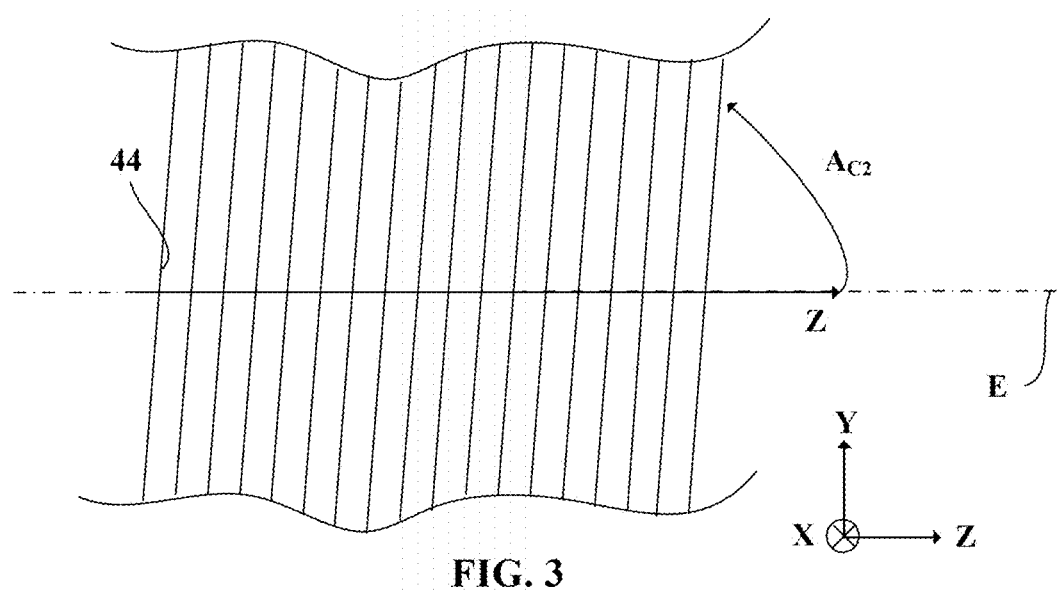
FIG. 3 is a view of the wire-like carcass reinforcer elements arranged in the side wall of the tyre of FIG. 1 in projection on the median plane M of the tyre.

Referring to FIG. 3 which is a simplified view in which, given the scale, all the wire-like carcass reinforcer elements 44 are represented parallel to one another, each wire-like carcass reinforcer element 44 forms an angle $A_{C2}$ greater than or equal to 85° with the circumferential direction Z of the tyre 10 in the equatorial circumferential plane E of the tyre 10, in other words in each side wall 22.

In this example, it is taken as convention that an angle oriented in the anti-clockwise direction from the reference straight line, here the circumferential direction Z, is of positive sign and that an angle oriented in the clockwise direction from the reference straight line, here the circumferential direction Z, is of negative sign. In this particular case, $A_{C1}=+67°$ and $A_{C2}=+90°$.

Referring to FIG. 2, the single working ply 18 comprises wire-like working reinforcer elements 46. Each wire-like working reinforcer element 46 forms an angle $A_T$ greater than or equal to 10°, preferably ranging from 30° to 50° and more preferentially from 35° to 45° with the circumferential direction Z of the tyre 10 in the median plane M. Given the orientation defined previously, $A_T=-40°$.

The single hooping ply 19 comprises at least one textile wire-like hoop reinforcer element 48. In this particular case, the hooping ply 19 comprises a single textile wire-like hoop reinforcer element 48 wound continually over an axial width $L_F$ of the crown 12 of the tyre 10. Advantageously, the axial width $L_F$ is less than the width $L_T$ of the working ply 18. The textile wire-like hoop reinforcer element 48 forms an angle $A_F$ strictly less than 10° with the circumferential direction Z of the tyre 10, preferably less than or equal to 7°, and more preferentially less than or equal to 5°. In this particular case, $A_F=+5°$.

The hooping ply has a tensile secant modulus equal to 261 daN/mm for a force equal to 15% of the breaking force of the hooping ply. The breaking force of the hooping ply is equal to 59 daN/mm.

It will be noted that the wire-like carcass 44, working 46 and hooping 48 reinforcer elements are arranged, in the crown 12, so as to define, in projection on the equatorial circumferential plane E, a triangular mesh. Here, the angle $A_F$ and the fact that the orientation of the angle $A_T$ and the orientation of the angle $A_{C1}$ are opposite relative to the circumferential direction Z of the tyre 10 make it possible to obtain this triangular mesh.

Each wire-like carcass reinforcer element 44 conventionally comprises two multifilament strands, each multifilament strand consisting of a spun yarn of monofilaments of polyesters, here of PET, these two multifilament strands being over twisted individually to 240 turns·m$^{-1}$ in one direction then retwisted together at 240 turns·m$^{-1}$ in the opposite direction. These two multifilament strands are helically wound around one another. Each of these multifilament strands has a count equal to 220 tex.

Each wire-like working reinforcer element 46 is an assembly of two monofilaments made of steel each having a diameter equal to 0.30 mm, the two steel monofilaments being wound with one another at a pitch of 14 mm.

Figure 4:
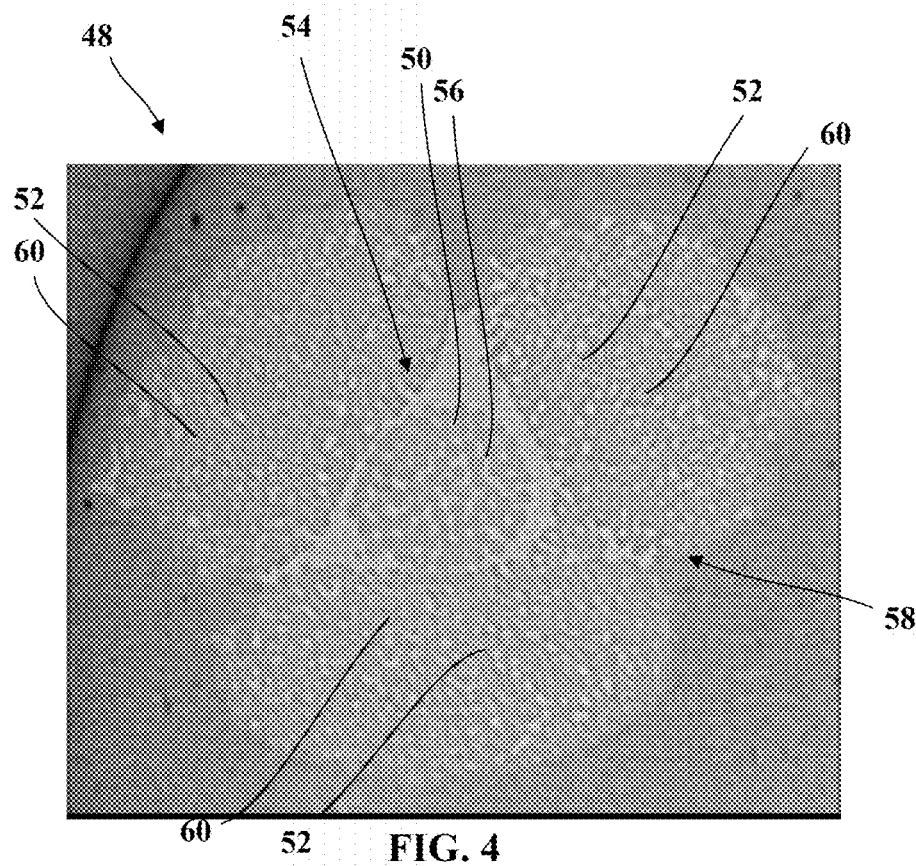
FIG. 4 is a photograph of a section at right angles to the axis of a bonded textile wire-like hoop reinforcer element (assumed rectilinear and at rest) of the tyre of FIG. 1.

The textile wire-like hoop reinforcer element 48, illustrated in FIG. 4, comprises at least one first strand 50 comprising at least one monofilament, in this particular case a first multifilament strand comprising several monofilaments. The first strand has a tensile secant modulus at 1% elongation less than or equal to 2500 cN/tex, preferably less than or equal to 900 cN/tex and more preferentially less than or equal to 500 cN/tex. In this particular case, the monofilaments of the first strand 50 are produced from a material chosen from among the polyesters, the aliphatic polyamides, the celluloses and the mixes of monofilaments of these materials, preferably produced from a material chosen from among the aliphatic polyamides and more preferentially produced here made of nylon 6.6.

The textile wire-like hoop reinforcer element 48 also comprises at least one second strand 52 comprising at least one monofilament, in this particular case several second multifilament strands each comprising several monofilaments. Each second strand 52 has a tensile secant modulus at 1% elongation greater than or equal to 500 cN/tex, preferably greater than or equal to 1000 cN/tex and more preferentially greater than or equal to 2200 cN/tex. In this particular case, the monofilaments of each second strand 52 are produced from a material chosen from among the aromatic polyamides, the aromatic copolyamides, the polyketones and the mixes of monofilaments of these materials, preferably produced from a material chosen from among the aromatic polyamides and more preferentially here made of para-aramid.

The textile wire-like hoop reinforcer element 48 comprises a core 54 consisting of a first strand 50 as described above. In other words, the core 54 comprises a single first strand 50, not two.

In the embodiment represented, the first multifilament strand 50 of the core 54 consists of a single spun yarn 56 of several monofilaments here made of nylon 6.6. The count of the first strand 50 of the core 54 goes from 10 tex to 100 tex and here from 40 tex to 60 tex. In this particular case, the first strand 50 of the core 54 consists of a spun yarn having a count equal to 47 tex known by the trade name Enka Nylon 4444HRT from the company PHP Fibers.

As a variant, it would be possible to envisage the first strand of the core comprising an assembly comprising several spun yarns, that is to say at least two spun yarns, distinct from monofilaments produced from a material chosen from among the polyesters, the aliphatic polyamides, the celluloses and the mixes of monofilaments of these materials, preferably produced from a material chosen from among the aliphatic polyamides and more preferentially made of nylon 6.6.

The textile wire-like hoop reinforcer element 48 also comprises a layer 58 comprising at least two second strands 52 as described above. Each second strand 52 of the layer 58 is helically wound around the core 54. The layer 58 consists of three or four second strands 52, and, here, three second strands 52.

In the embodiment represented, each second multifilament strand 52 of the layer 58 consists of a single spun yarn 60 of monofilaments here made of para-aramid. The count of each second strand 52 of the layer 58 goes from 50 tex to 350 tex and here from 130 tex to 220 tex. In this particular case, each second strand 52 of the layer 58 consists of a spun yarn of monofilaments of para-aramid having a count equal to 167 tex known by the trade name Twaron 1000 from the company Teijin.

As a variant, it would be possible to envisage each second strand of the layer comprising an assembly comprising several spun yarns, that is to say at least two spun yarns distinct from monofilaments produced from a material chosen from among the aromatic polyamides, the aromatic copolyamides, the polyketones and the mixes of monofilaments of these materials, preferably produced from a material chosen from among the aromatic polyamides and more preferentially made of para-aramid.

The sum of the tensile stiffnesses Sc at 1% elongation of the second strands 52 is greater than the tensile stiffness Sa at 1% elongation of the first strand 50. In this particular case, the tensile stiffness at 1% elongation of each second strand made of para-aramid is equal to 621 daN and the tensile stiffness at 1% elongation of the first strand made of nylon 6.6 is equal to 15 daN. This gives Sc=3×621>Sa=15, preferably Sc/Sa≥10, more preferentially Sc/Sa≥50 and even more preferentially Sc/Sa≥100.

The ratio of the count of the first strand of the core to the sum of the counts of the second strands of the layer goes from 0.05 to 0.15 and here is equal to 0.09.

Method for Producing the Textile Wire-Like Hoopinq Element

The bonded textile wire-like reinforcer element 48 is produced by implementing a production method comprising the following steps.

The method comprises, first of all, steps of assembly of a raw textile wire-like reinforcer element in which the first strand 50 of the core 54 and the second strands 52 of the layer 58 are assembled so as to form a raw textile wire-like reinforcer element.

In a step of twisting of the first strand 50 of the core 54, a twist is applied to the first strand 50 according to a number of turns per metre N1 in a first twisting direction, for example the direction Z. In another step of twisting of each second strand 52 of the layer 58, a twist is applied to each second strand 52 according to a number of turns per metre N1' in the first twisting direction Z.

Then, in a step of assembly by twisting of the first strand 50 of the core 54 and of the second strands 52 of the layer 58, a twist is applied to the set of the strands 50, 52 of the core and of the layer according to a number of turns per metre N2 in a second twisting direction opposite the first twisting direction, here in the direction S.

N1, N1' and N2 are chosen such that the residual twist of the monofilaments of the first strand 50 of the core 54 and the residual twist of the monofilaments of each second strand 52 of the layer 58 is less than or equal to 10 turns·m$^{-1}$, preferably substantially zero. The choice of N1, N1', N2 then depends on the count of each strand, on the number of second strands of the layer, but also on parameters of the production method, notably on the tensions $T_1$, $T_2$ respectively of the first and second strands and/or on the speeds $V_1$, $V_2$ respectively of the first and second strands in the assembly device. Thus, N1>N1' and N2=N1'. Advantageously, 1.02≤N1/N1'≤1.15, and preferably 1.05≤N1/N1'≤1.10. Here N1/N1'=1.08.

N1 goes from 300 to 380 turns per metre, preferably from 320 to 360 turns per metre and here N1=340 turns per metre. N1' goes from 275 to 355 turns per metre, preferably from 295 to 335 turns per metre and here N1'=315 turns per metre. N2 goes from 275 to 355 turns per metre, preferably from 295 to 335 turns per metre and here N2=315 turns per metre.

Thus, the density of the nylon 6.6 being equal to 1.14 and the density of the para-aramid being equal to 1.44, the twist factor of the first strand 50 of the core 54 goes from 60 to 80, preferably from 65 to 75 and here is equal to 69. The twist factor of each second strand 52 of the layer 58 goes from 90 to 120, preferably from 100 to 115 and is, here, equal to 107.

The weighted density of the textile wire-like hoop reinforcer element 48 being equal to 1.41 and the weighted count of the textile wire-like hoop reinforcer element 48 being equal to 548 tex, the twist factor of the textile wire-like hoop reinforcer element 48 goes from 170 to 220, preferably from 180 to 210 and is, here, equal to 196.

Before the assembly of the first and second strands 50, 52, the method comprises a fetching step, during which the first strand 50 and the second strands 52 are conveyed to an assembly point where the first and second strands 50, 52 are assembled. The method advantageously comprises a step of servo controlling strand tension, in closed loop mode, during which:

a tension setpoint, called "assembly tension setpoint", is defined, which is representative of a state of longitudinal tension that is desired to be obtained in each strand 50, 52 when each strand 50, 52 arrives at the assembly point, at a first tension measurement point, which is situated along each strand 50, 52 and upstream of the assembly point relative to the direction of conveyance of each strand 50, 52, the tension, called "effective assembly tension", which is exerted within each strand 50, 52, is measured, and a tension feedback loop is used to determine an error, called "tension error", which corresponds to the difference between the assembly tension setpoint and the effective assembly tension of each strand 50, 52, on the basis of said tension error, a tension regulator member, which acts on each strand 50, 52 upstream of the assembly point, is controlled so as to make the effective assembly tension converge automatically, within each strand 50, 52, towards the assembly tension setpoint.

The installation making it possible to implement this method can correspond to a ring spinning frame that will have been refined by adding to it notably a tension servo control unit, or tension servo control units, making it possible to servo control in closed loop mode the tension of each strand 50, 52.

In practice, the installation comprises a fetching device arranged so as to make it possible to unwind and convey to the assembly point each strand 50, 52 from an input reel on which each strand 50, 52 is initially stored. The fetching device concerned will advantageously be able to comprise a motorized drive device situated upstream of the assembly point and arranged to confer on each strand 50, 52 a speed, called "forward speed", in response to a drive setpoint that is applied to the drive device. Thus, the motorized drive device makes it possible to drive each strand 50, 52 in a direction called "direction of conveyance", from the input reel to the assembly point. By convention, it will be considered that the direction of conveyance according to which each strand 50, 52 is displaced from the input reel to the assembly point then beyond corresponds to an upstream-downstream direction of displacement. The motorized drive device will be able to comprise, for example, a capstan or, as a variant, a take-up trio. Such a take-up trio comprises three rollers, including one planetary roller, preferably free, and two satellite rollers, preferably motorized and synchronized, the rollers being arranged so that each strand 50, 52 is driven by friction between the rollers, along a Ω (upper-case omega)-shaped path. In this configuration intended to drive each strand 50, 52 in displacement, the planetary roller can preferably come into contact with the two satellite rollers, and the cylindrical surface of the planetary roller can be coated with a layer of non skid gum, in order to enhance the driving of the planetary roller by the satellite rollers. Obviously, the fetching device will be able to comprise several distinct motorized drive devices, each assigned to a different strand.

According to one possibility of arrangement, also known per se in an installation of "ring spinning frame" type, the installation can comprise a guiding eyelet, for example made of ceramic, intended to guide the textile wire-like element downstream of the assembly point, here directly downstream of the assembly point, and a ring which is coaxial to an output reel and on which a cursor, which forms a point of passage of the textile wire-like element situated downstream of the guiding eyelet and upstream of the output reel, is mounted to glide freely.

Thus, when the output reel is driven in rotation on its axis, preferably vertical, by means of a motorized spindle, and thus exerts tension on the textile wire-like element, while the supply of strands is ensured by the fetching device, the cursor adopts a relative rotational movement around the output reel which provokes an effort of curling of the textile wire-like element, and therefore the twisting of the strands at the assembly point, while guiding the progressive winding of the textile wire-like element on the output reel. The ring is also driven by a translational reciprocal movement along the axis of the output reel so as to distribute the turns of textile wire-like element over all the length of the output reel. Moreover, the fetching device can preferably comprise a distributor arranged to distribute the strands in the space in order to order the geometric configuration according to which the strands converge towards the assembly point situated downstream of, here directly downstream of, and more preferentially just below, the distributor. The distributor can take the form of a support plate which defines a plurality of points of passage each intended to guide the strands coming from the input reels and/or from the motorized drive devices.

The method comprises a step of strand tension servo control. The tension of each strand 50, 52 corresponds to the longitudinal tensile effort which is exerted within each strand 50, 52 at the point considered, and therefore to the tensile stress which results from the application of this effort. The tension servo controlling of each strand 50, 52 is applied in closed loop mode. During the step of tension servo controlling each strand 50, 52:

- a tension setpoint is defined, called "assembly tension setpoint" T_set, which is representative of a state of longitudinal tension that is desired to be obtained in each strand 50, 52 when each strand 50, 52 arrives at the assembly point,
- at a first tension measurement point PT1 which is situated along each strand 50, 52 and upstream of the assembly point relative to the direction of conveyance of each strand 50, 52, the tension, called "actual assembly tension" T_actual, which is exerted within each strand 50, 52 is measured,
- a tension feedback loop is used to determine an error, called "tension error" ER_T, which corresponds to the difference between the assembly tension setpoint and the actual assembly tension of each strand 50, 52: ER_T=T_set−T_actual, and
- a tension regulator member, which acts on each strand 50, 52 upstream of the assembly point is controlled on the basis of the tension error ER_T so as to make the actual assembly tension T_actual converge, automatically within each strand 50, 52, towards the assembly tension setpoint T_set.

The installation therefore comprises a tension servo control unit, arranged to servo control the tension of the concerned strand in closed loop mode according to a mode of operation called "tension servo control mode", the tension servo control unit comprising, to this end:

- a tension setpoint setting member, which makes it possible to set a setpoint, called "assembly tension setpoint" T_set, which is representative of a state of longitudinal tension that is desired to be obtained in each strand 50, 52 when the strand arrives at the assembly point,
- a tension monitoring member which measures, at a first tension measurement point PT1 which is situated along each strand 50, 52 and upstream of the assembly point relative to the direction of conveyance of each strand 50, 52, the tension, called "actual assembly tension" T_actual, which is exerted within each strand 50, 52,
- a tension feedback member which assesses an error, called "tension error" ER_T, which corresponds to the difference between the assembly tension setpoint T_set and the actual assembly tension T_actual of each strand 50, 52, and
- a tension regulator member, placed dependent on the tension feedback member, and which acts on each strand 50, 52 upstream of the assembly point so as to make the actual assembly tension T_actual converge automatically, within each strand 50, 52, towards the assembly tension setpoint T_set.

Obviously, it will be possible to set different assembly tension setpoints T_set for each strand 50, 52 and ensure a separate regulation of each strand 50, 52, independent of the other strands.

Moreover, during the fetching step, each strand 50, 52 is preferably, as already mentioned above, driven in displacement towards the assembly point by means of a motorized drive device, such as a capstan, which is situated upstream of the assembly point and which is arranged to confer on each strand 50, 52 a speed called "forward speed" V_fwd in response to a drive setpoint that is applied to the motorized drive device. Preferably, the first tension measurement point PT1, where the actual assembly tension T_actual is measured, is then chosen such that said first tension measurement point PT1 is situated in a section of each strand 50, 52, called "approach section", which extends from the motorized drive device, upstream, and the assembly point, downstream. Thus, advantageously, the measurement of the actual assembly tension T_actual is done at a measurement point PT1 which lies between the position (considered along the path taken by the strand concerned) of the motorized drive device and the position (considered along the path taken by the strand concerned) of the assembly point, which is therefore particularly close to the assembly point. More particularly, the tension measurement point PT1 thus chosen can therefore be situated between the assembly point and the last motor element, here the motorized drive device, which precedes the assembly point, in the upstream-downstream direction of the path of the strand concerned. The actual assembly tension T_actual is therefore measured preferably downstream of the last motorized device (here the motorized drive device) which is likely to actively act on the strand concerned and significantly modify the tension thereof before the strand concerned arrives at the assembly point. Consequently, the measurement of the actual assembly tension T_actual, which is performed as close as possible to the assembly point, in an approach section with little disturbance from external forces, is particularly reliable, and well representative of the tension really exerted in the strand concerned at the moment when the strand reaches the assembly point.

According to a preferential feature, during the strand tension servo control step, the motorized drive device, in particular the motorized drive device associated with the strand concerned, will preferably be used as tension regulator member, by adjusting, as a function of the tension error ER_T, the drive setpoint that is applied to the motorized drive device. Advantageously, the use of a motorized device makes it possible, as a function of the measured tension error ER_T, either to slow down the strand concerned, upstream of the assembly point, by applying to the strand concerned, via the motorized device, a forward speed V_fwd that is sufficiently reduced, which will cause the strand concerned to be held back and therefore the tension concerned to be increased, or, on the contrary, to speed up the strand concerned, upstream of the assembly point, that is to say increase the forward speed V_fwd of the strand concerned, which will cause the tension of the strand concerned to be reduced, by "giving slack" to the strand concerned.

Advantageously, it will thus be possible to apply, simultaneously and simply to each strand 50, 52, as many tension regulations, independent of one another, as there are strands.

According to another preferential feature, if, during the fetching step, the strand concerned, for example the first strand 50, is driven in displacement towards the assembly point by means of a motorized drive device, such as a capstan, which is situated upstream of the assembly point, notably as described above, then the method can also comprise an unwinding step, during which the strand concerned, here for example the first strand 50, is unwound from an input reel, by means of an unwinding device which is distinct from the motorized drive device of the strand concerned and which is situated upstream of said motorized drive device. The unwinding device comprises a motorized reel-holder intended to receive and drive in rotation, at a chosen speed, called "input reel speed" ω7, the input reel concerned. Advantageously, it is then possible to measure, at a second tension measurement point PT2 which is situated along the strand concerned, here for example along the first strand 50, between the motorized reel-holder and the motorized drive device, the tension "actual unwinding tension" T_unwind_actual which is exerted in the strand concerned, and adjust accordingly the input reel speed ω7 so as to make said actual unwinding tension T_unwind_actual converge towards a predetermined unwinding tension setpoint T_unwind_set. In fact, by controlling, on the one hand upstream, the input reel speed ω7 and therefore the unwinding speed at which the strand is released, and on the other hand downstream, it is advantageously possible to choose the strand unwinding tension, which prevails between the unwinding device, upstream, and the motorized drive device, downstream. Advantageously, the strand concerned, which appears at the input of the motorized drive device, thus obtains an actual unwinding tension T_unwind_actual that is well controlled, which sets a first pre-tension level, from which it will then be possible, through the action of the motorized drive device, to modify the state of tension of the strand in the approach section, downstream of the motorized drive device and upstream of the assembly point, in order to confer on said strand the desired actual assembly tension T_actual. In this respect, it has been observed that the creation and the maintaining, through a dual motorization (that of the unwinding device and that of the motorized drive device), of a tension prestress, in the form of an actual unwinding tension T_unwind_actual of regular and well controlled value, advantageously made it possible to more accurately and more easily adjust the actual assembly tension T_actual of the strand concerned. It will be noted in particular that the existence of a first tension level, equal to the actual unwinding tension T_unwind_actual, makes it possible, through an additive action (increase in the tension by braking the strand) or, on the contrary, through a subtractive action (reducing tension by speeding up the strand) exercised by the motorized drive device from this first level, to accurately reach a resultant actual assembly tension T_actual, forming a second tension level, and which will be freely chosen from a very wide actual assembly tension range, the bottom limit of which is lower (in absolute value) than the first tension level, that is to say than the actual unwinding tension T_unwind_actual, and the top limit is above said first tension level. More particularly, the existence of a first tension level makes it possible to lower, in the second tension level, the assembly tension (both the setpoint and the actual assembly tension) T_set, T_actual, to a very low level, for example of the order of a few centi-Newtons (which is equivalent to the weight of a mass of a few grams) or of a few tens of centi-Newtons (which is equivalent to the weight of a mass of a few tens of grams), without the risk of creating tension jerks in the strand, and without the risk of causing the actual assembly tension T_actual to pass through a zero value with the potential attendant risk of causing the strand to leave the guides (pulleys, rollers, etc.) which define the path of the strand through the installation. In particular, such a method with two tension levels, using two tension measurement points PT1, PT2 situated upstream of the assembly point, on one and the same strand and at a distance from one another, notably makes it possible to obtain an effective regulation within an assembly tension range lying between T_actual=5 cN (five centi-Newtons) and T_actual=100 cN (one hundred centi-Newtons), that is reached by "subtraction" from the first voltage level. As an example, for the first tension level, it will be possible to choose an unwinding tension T_unwind_set (and therefore obtain an actual unwinding tension T_unwind_actual) lying between 50 cN (fifty centi-Newtons) and 600 cN, and for example equal to 100 cN, to 200 cN, or to 400 cN, and obtain, at the second tension level, an accurate and stable assembly tension T_actual which will be perfectly in accordance with a setpoint T_set that will have been freely chosen from a very wide possible range, between 15 cN (fifteen centi-Newtons, which corresponds to a mass of approximately 15 grams) and 100 N (one hundred Newtons, which corresponds to a mass of approximately ten kilograms), even between 5 cN (five centi-Newtons which corresponds to a mass of approximately 5 grams) and 200 N (two hundred Newtons, which corresponds to a mass of approximately twenty kilograms).

According to a preferential feature, the installation comprises a forward speed servo control unit arranged to servo control the forward speed V_fwd of each strand in closed loop mode, according to a mode of operation called "speed servo control mode", the speed servo control unit comprising, to this end:

a speed setpoint setting member which makes it possible to set a setpoint, called "forward speed setpoint" V_fwd_set, which corresponds to a forward speed value that is desired to be conferred on each strand upstream of the assembly point, a speed monitoring member which measures, at a forward speed measurement point PV1 which is situated along each strand and upstream of the assembly point, a speed value called "actual forward speed" V_fwd_actual which is representative of the actual forward speed of each strand at the measurement point PV1 concerned, a speed feedback member which assesses an error, called "speed error" ER_V, which corresponds to the difference between the forward speed setpoint and the actual forward speed of each strand: ER_V=V_fwd_set−V_fwd_actual, and a speed regulator member, placed under the dependency of the speed feedback member, and which acts on each strand upstream of the assembly point, so as to make the actual forward speed V_fwd_actual of each strand converge automatically towards the forward speed setpoint V_fwd_set.

The installation can then preferably comprise a selector which makes it possible to selectively activate, for each strand, the tension servo control mode or the speed servo control mode. In other words, the user is offered a selection option, for each strand, between a servo control mode based on tension, and a servo control mode for each strand based on forward speed. The method will therefore be able to provide a corresponding selection step. In this particular case, it is possible to produce multiple assembly combinations, within which each strand is tension-regulated, even several strands are tension-regulated, while another strand, even several other strands, are speed-regulated.

It will also be noted that the speed servo control, and notably the measurement of the actual forward speed F_fwd_actual of the strand concerned, takes place preferably in proximity to the assembly point, for example in the approach section, lying between the last motorized element which precedes the assembly point and the assembly point, in order for the forward speed concerned, and servo controlled, to be representative of the forward speed at which the strand arrives at the assembly point. Preferably, the speed measurement point PV1 will be able to be situated at the motorized drive device.

For given counts and twists, it is possible to vary the force-elongation curve of the textile wire-like element, and therefore notably its tangent modulus, by varying the tension $T_1$ or the speed $V_1$ applied to the core during the assembly step of the method of production thereof. In this particular case, by increasing the tension $T_1$ relative to $T_2$ or by reducing the speed $V_1$ relative to the speed $V_2$, the tangent modulus is reduced for all elongations, the elongation at break is increased and the breaking force of the textile wire-like element is reduced. Conversely, by lowering the tension $T_1$ relative to $T_2$ or by increasing the speed $V_1$ relative to the speed $V_2$, the tangent modulus is increased for all elongations, the elongation at break is reduced and the breaking force of the textile wire-like element is increased. In addition to varying the tangent modulus, increasing the tension $T_1$ relative to $T_2$ or reducing the speed $V_1$ relative to $V_2$ makes it possible to improve the endurance of the textile wire-like element as is demonstrated in the endurance test described below. In this particular case, the speed $V_1$ applied to the first strand 50 of the core 54 is equal to 9.3 m/min. The speed $V_2$ applied to each second strand 52 of the layer 58 is equal to 10.55 m/min. The tension applied to the raw textile wire-like element 48 in the assembly step is equal to 1200 cN.

After the assembly steps described above, the raw wire-like reinforcer element is obtained. The production method then comprises a step during which the raw textile wire-like reinforcer element is coated with an intermediate layer of a first thermoreticulable adhesive compound. In this particular case, a first adhesive compound is used that has a primary adhesion function and comprises an epoxy resin in aqueous solution, for example based on polyglycerol polyglycidyl ether. The method then comprises a first step of heat treatment of the raw textile wire-like reinforcer element coated with the intermediate layer so as to crosslink the first adhesive compound. A pre-bonded textile wire-like reinforcer element is then obtained.

Then, the method comprises a second step of coating of the pre-bonded textile wire-like reinforcer element with an outer layer of a second thermoreticulable adhesive compound. In this particular case, a conventional aqueous adhesive compound of RFL (Resorcinol-Formaldehyde-Latex elastomer(s)) type is used. Then, the method comprises a second step of heat treatment of the pre-bonded textile wire-like reinforcer element coated with the outer layer so as to crosslink the second adhesive compound. The bonded textile wire-like reinforcer element is then obtained prior to the step of production of the hooping ply.

For the bonded textile wire-like reinforcer element 48, during the first step of coating by and of heat treatment of the raw reinforcer element coated with the intermediate layer, a tension $T_{T1}$, here equal to 0.2 daN, is applied to the raw reinforcer element coated with the intermediate layer. During the second step of coating by and of heat treatment of the pre-bonded reinforcer element coated with the outer layer, a tension $T_{T2}$, here equal to 0.2 daN, is applied to the pre-bonded reinforcer element coated with the outer layer.

Tyre Production Method

The tyre 10 is produced according to the method described below.

First of all, the working ply 18 and the carcass ply 34 are produced by arranging, parallel to one another, the wire-like reinforcer elements of each ply and by embedding them, for example by calendering, in a non-reticulated compound comprising at least one elastomer, the compound being intended to form an elastomeric matrix once crosslinked. A so-called straight ply is obtained, in which the wire-like reinforcer elements of the ply are parallel to one another and are parallel to the main direction of the ply. Then, if necessary, portions of each straight ply are cut according to a cutting angle and these portions are butted against one another so as to obtain a so-called angle ply, in which the wire-like reinforcer elements of the ply are parallel to one another and form an angle with the main direction of the ply equal to the cutting angle.

Then, an assembly method as described in EP1623819 or else in FR1413102 is implemented.

During this assembly method, the hooping reinforcement 17, here the hooping ply 19, is arranged radially outside the working reinforcement 16. In this particular case, in a first variant, a bandlet is produced that has a width B significantly less than $L_F$, in which the bonded textile wire-like reinforcer element 48 is embedded in a non-reticulated compound and the bandlet is helically wound over several turns so as to obtain the axial width $L_F$. In a second variant, the hooping ply 19 is produced with a width $L_F$ in a way similar to the carcass and working plies, and the hooping ply 19 is wound over one turn on the working reinforcement 16. In a third variant, the bonded textile wire-like reinforcer element 48 is wound radially outside of the working ply 18 and then there is applied on top a layer of a compound in which the textile wire-like hoop reinforcer element 48 will be embedded during the baking of the tyre. In the three variants, the bonded textile wire-like reinforcer element 48 is embedded in a compound to form, at the end of the tyre production method, the hooping ply 19 comprising the textile wire-like hoop reinforcer element 48.

After a step of placement of the tread 20, the tyre then obtained is one in which the compounds of the elastomeric matrices are not yet crosslinked and are in a raw state. This is then called a raw blank of the tyre.

Finally, the compounds are crosslinked, for example by baking or vulcanization, in order to obtain the tyre in which the compounds have a crosslinked state. During this baking step, the tyre whose elastomeric matrices are in the raw state is expanded radially, circumferentially and axially, for example by the pressurization of an inflation membrane, so as to press the tyre against surfaces of a baking mould. This radial and circumferential expansion is, here, advantageously implemented using the bonded textile wire-like reinforcer elements of the first and second embodiments.

Comparative Tests
Force-Elongation Curve

Figure 5:
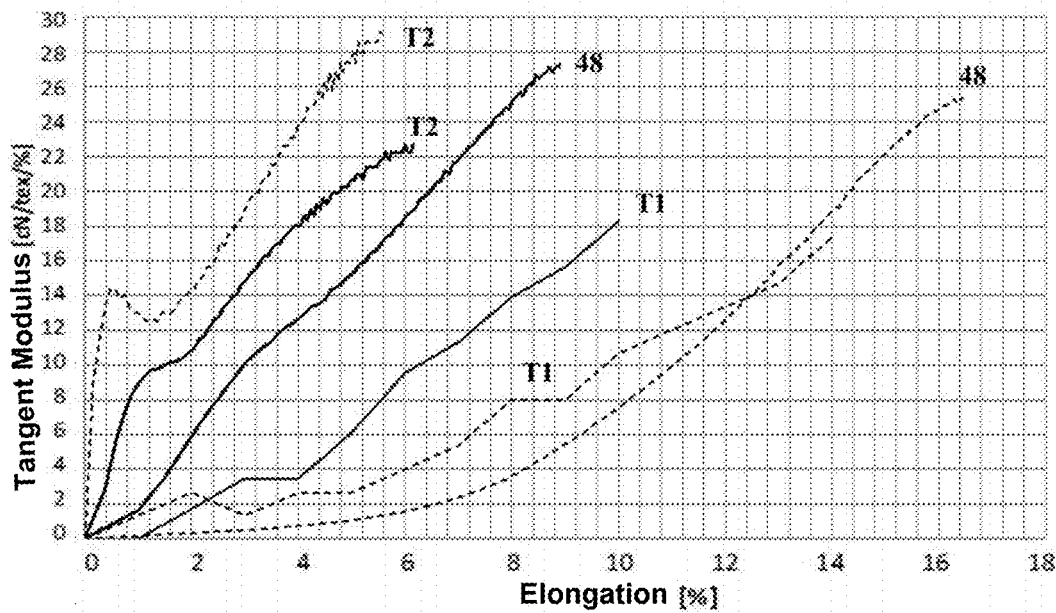
FIG. 5 is a graph representing the variation of the tangent moduluses of bonded textile wire-like hoop reinforcer elements of tyres according to the invention and according to the state of the art.

A hybrid textile wire-like element of U.S. Pat. No. 6,799,618 designated by the reference T1, a conventional hybrid textile wire-like element of WO2016/166056 designated by the reference T2 and the bonded textile wire-like reinforcer element 48 described above were compared. The tangent modulus of each of these textile wire-like elements was measured before the step of production of the hooping ply (dotted line curves) and once extracted from the tyre (continuous line curves). The variation of the tangent moduluses of these textile wire-like elements are represented in FIG. 5.

Referring to the dotted line curves, it will be noted that, before the step of production of the hooping ply, the bonded textile wire-like element 48 has, unlike the textile wire-like element T2, a tangent modulus less than or equal to 3 cN/tex/% for any elongation less than or equal to 2%. In this particular case, before the step of production of the hooping ply, the bonded textile wire-like reinforcer element 48 has a tangent modulus less than or equal to 3 cN/tex/% for any elongation less than or equal to 6% and even less than or equal to 7%.

It will also be noted that, before the step of production of the hooping ply, the bonded textile wire-like reinforcer element 48 has a tangent modulus less than or equal to 5 cN/tex/% for any elongation less than or equal to 3%. In this particular case, before the step of production of the hooping ply, the bonded textile wire-like reinforcer element 48 has a tangent modulus less than or equal to 5 cN/tex/% for any elongation less than or equal to 8.5%.

Furthermore, it will be noted that, before the step of production of the hooping ply, the bonded textile wire-like reinforcer element 48 has a tangent modulus less than or equal to 10 cN/tex/% for any elongation less than or equal to 5%. In this particular case, before the step of production of the hooping ply, the bonded textile wire-like reinforcer element 48 has a tangent modulus less than or equal to 10 cN/tex/% for any elongation less than or equal to 10%, even less than or equal to 11%.

Furthermore, it will be noted that, before the step of production of the hooping ply, the bonded textile wire-like reinforcer element 48 has a tangent modulus less than or equal to 15 cN/tex/% for any elongation less than or equal to 6%. In this particular case, before the step of production of the hooping ply, the bonded textile wire-like reinforcer element 48 has a tangent modulus less than or equal to 15 cN/tex/% for any elongation less than or equal to 12%.

On the other hand, the textile wire-like element T2 has, before the step of production of the hooping ply, a tangent modulus less than or equal to 5 cN/tex/% for elongations only less than or equal to 0.1%. Beyond 0.1% elongation, the tangent modulus of the textile wire-like element T2, before the step of production of the hooping ply, is greater than 5 cN/tex/%.

Furthermore, the tangent modulus of the textile wire-like element T2, if it exceeds 10 cN/tex/% for any elongation greater than or equal to 0.2%, is meaningless for any elongation greater than or equal to 6% which is the value of the elongation at break of the textile wire-like element T2. The bonded textile wire-like reinforcer element 48 has, before the step of production of the hooping ply, an elongation at break that is very much higher, and here greater than or equal to 10%, in this particular case greater than or equal to 14%, even greater than or equal to 15%, even greater than or equal to 16%, and here equal to 16.5%.

Referring to the continuous line curves, it will be noted that, once extracted from the tyre, the textile wire-like hoop reinforcer element 48 has a tangent modulus greater than or equal to 5 cN/tex/% for any elongation greater than or equal to 4%, even greater than or equal to 3.5%, even greater than or equal to 3% and, in the example described, greater than or equal to 2%. The textile wire-like element T1 has, once extracted from the tyre, a tangent modulus greater than 5 cN/tex/% for elongations only greater than 4.5%.

It will also be noted that, once extracted from the tyre, the textile wire-like hoop reinforcer element 48 has a tangent modulus greater than or equal to 10 cN/tex/% for any elongation greater than or equal to 6%, even greater than or equal to 5%, even greater than or equal to 4% in the example described. On the contrary, the textile wire-like element T1 has, once extracted from the tyre, a tangent modulus greater than or equal to 10 cN/tex/% for elongations only greater than 6.3%.

The textile wire-like hoop reinforcer element 48 has, once extracted from the tyre, a tangent modulus greater than or equal to 15 cN/tex/% for any elongation greater than or equal to 8%, even greater than or equal to 7% and, in the example described, greater than or equal to 6%. On the contrary, the textile wire-like element T1 has, once extracted from the tyre, a tangent modulus greater than or equal to 15 cN/tex/% for elongations only greater than 8.6%.

The textile wire-like hoop reinforcer element 48 has, once extracted from the tyre, a tangent modulus greater than or equal to 20 cN/tex/% for any elongation greater than or equal to 8%. The tangent modulus of the textile wire-like element T1, once extracted from the tyre, never reaches the value of 20 cN/tex/%.

Finally, it will be noted that, once extracted from the tyre, the textile wire-like hoop reinforcer element 48 has an elongation at break greater than or equal to 6%, preferably greater than or equal to 7% and more preferentially greater than or equal to 8%. The textile wire-like element T2 has a much lower elongation at break, here equal to 6%.

From these curves, it can be seen that, on the one hand, the textile wire-like hoop reinforcer element 48 has high mechanical strength properties once extracted from the tyre, notably a tangent modulus significantly higher than that of T1, and relatively close to that of T2, even greater for elongations greater than the elongation at break of T2. On the other hand, it is found that the bonded textile wire-like reinforcer element 48 has, before the step of production of the hooping ply, a relatively low tangent modulus, here significantly lower than that of T2 and less than that of T1 up to elongations less than 12%, allowing for easy radial and circumferential deformations of the tyre during its production method.

Endurance Test

The resistance to compression fatigue, in other words the compression endurance, of the conventional T2 hybrid textile wire-like element of WO2016/166056 and of the bonded textile wire-like reinforcer elements I1 to I7 similar to the bonded textile wire-like reinforcer element 48 described above, and all conforming to the invention, is tested.

The bonded textile wire-like reinforcer elements I1 to I7 are structurally identical to the bonded textile wire-like element 48 but are obtained by implementing different production methods in which the speed $V_2$ of each second strand 54 of the layer 58 is respectively equal to 10.34 m·min$^{-1}$, 10.36 m·min$^{-1}$, 10.42 m·min$^{-1}$, 10.49 m·min$^{-1}$, 10.55 m·min$^{-1}$, 10.62 m·min$^{-1}$ and 10.69 m·min$^{-1}$ for each textile wire-like element I1 to I7 and the speed $V_1$ of first strand 50 of the core 54 is equal to 9.3 m·min$^{-1}$. The tension $T_{T1}$ is equal to 0.15 daN for all the textile wire-like reinforcer elements I1 to I7. The tension $T_{T2}$ is equal to 0.15 daN for all the textile wire-like reinforcer elements I1 to I7.

The tension applied to each raw textile wire-like element I1 to I7 during the assembly step is equal to 1200 cN.

Figure 6:
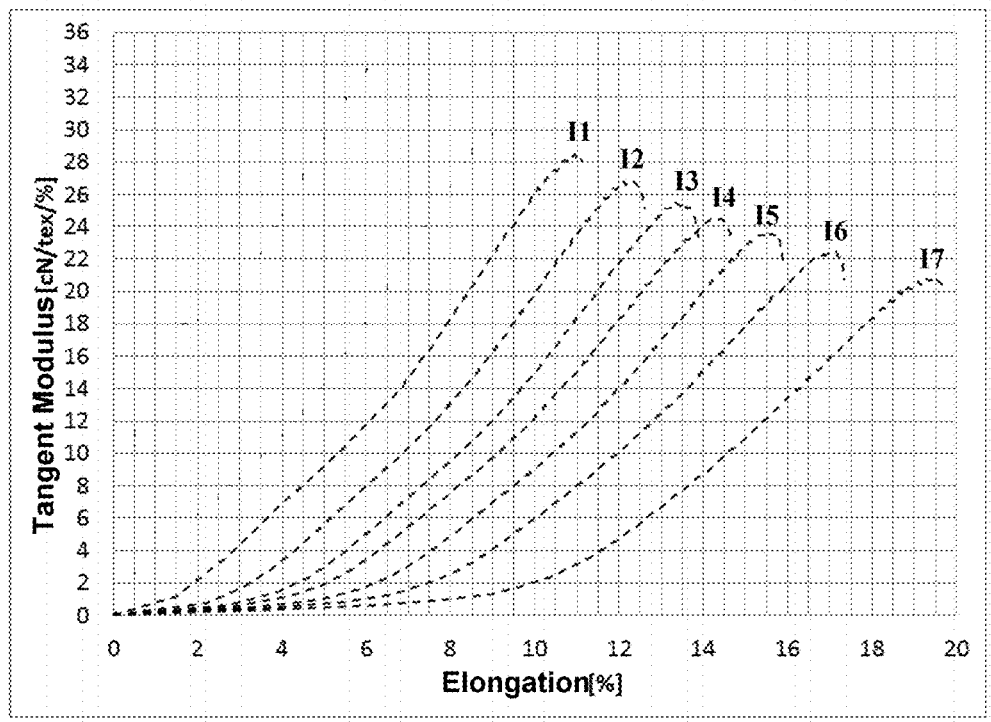
FIG. 6 is a graph representing the variation of the tangent moduluses of bonded wire-like hoop reinforcer elements of tyres according to the invention before the step of production of the hooping ply.

The tangent modulus of each of these bonded textile wire-like elements I0 to I7 was measured before the step of production of the hooping ply (dotted line curves) and the variation of the tangent moduluses of these bonded textile wire-like elements I0 to I7 is represented in FIG. 6.

Each bonded textile wire-like element I1 to I7 has, before the step of production of the hooping ply, a tangent modulus less than or equal to 5 cN/tex/% for any elongation less than or equal to 3%. Furthermore, each bonded textile wire-like element I1 to I7 has, before the step of production of the hooping ply, a tangent modulus less than or equal to 3 cN/tex/% for any elongation less than or equal to 2%. Furthermore, each bonded textile wire-like element I1 to I7 has, before the step of production of the hooping ply, a tangent modulus less than or equal to 10 cN/tex/% for any elongation less than or equal to 5%. Finally, each bonded textile wire-like element I1 to I7 has, before the step of production of the hooping ply, a tangent modulus less than or equal to 15 cN/tex/% for any elongation less than or equal to 6%.

Each bonded textile wire-like reinforcer element I1 to I4 has, before the step of production of the hooping ply, a tangent modulus greater than or equal to 3 cN/tex/% for any elongation greater than or equal to 6%. Each bonded textile wire-like reinforcer element I1 to I3 has, before the step of production of the hooping ply, a tangent modulus greater than or equal to 3 cN/tex/% for any elongation greater than or equal to 5%.

Each bonded textile wire-like reinforcer element I1 and I2 has, before the step of production of the hooping ply, a tangent modulus greater than or equal to 3 cN/tex/% for any elongation greater than or equal to 4%. The bonded textile wire-like reinforcer element I1 has, before the step of production of the hooping ply, a tangent modulus greater than or equal to 3 cN/tex/% for any elongation greater than or equal to 3%.

Each bonded textile wire-like reinforcer element I1 to I4 has, before the step of production of the hooping ply, a tangent modulus greater than or equal to 5 cN/tex/% for any elongation greater than or equal to 7.5%. Each bonded textile wire-like reinforcer element I1 to I3 has, before the step of production of the hooping ply, a tangent modulus greater than or equal to 5 cN/tex/% for any elongation greater than or equal to 6.5%. Each bonded textile wire-like reinforcer element I1 and I2 has, before the step of production of the hooping ply, a tangent modulus greater than or equal to 5 cN/tex/% for any elongation greater than or equal to 5.5%. The bonded textile wire-like reinforcer element I1 has, before the step of production of the hooping ply, a tangent modulus greater than or equal to 5 cN/tex/% for any elongation greater than or equal to 4.5%.

Each bonded textile wire-like reinforcer element I1 to I4 has, before the step of production of the hooping ply, a tangent modulus greater than or equal to 10 cN/tex/% for any elongation greater than or equal to 10%. Each bonded textile wire-like reinforcer element I1 to I3 has, before the step of production of the hooping ply, a tangent modulus greater than or equal to 10 cN/tex/% for any elongation greater than or equal to 8.5%. Each bonded textile wire-like reinforcer element I1 and I2 has, before the step of production of the hooping ply, a tangent modulus greater than or equal to 10 cN/tex/% for any elongation greater than or equal to 7.5% and even more preferentially for any elongation greater than or equal to 6.5%.

Each bonded textile wire-like reinforcer element I1 to I4 has, before the step of production of the hooping ply, a tangent modulus greater than or equal to 15 cN/tex/% for any elongation greater than or equal to 12%, preferably for any elongation greater than or equal to 10.5%. Each bonded textile wire-like reinforcer element I1 to I3 has, before the step of production of the hooping ply, a tangent modulus greater than or equal to 15 cN/tex/% for any elongation greater than or equal to 9%. Each bonded textile wire-like reinforcer element I1 and I2 has, before the step of production of the hooping ply, a tangent modulus greater than or equal to 15 cN/tex/% for any elongation greater than or equal to 7.5%.

Each bonded textile wire-like reinforcer element I1 to I7 has, before the step of production of the hooping ply, an elongation at break greater than or equal to 10%. Each bonded textile wire-like reinforcer element I1 to I3 has, before the step of production of the hooping ply, an elongation at break less than or equal to 14%. Each bonded textile wire-like reinforcer element I1 and I2 has, before the step of production of the hooping ply, an elongation at break less than or equal preferably less than or equal to 13%.

Each bonded textile wire-like reinforcer element I5 to I7 has, before the step of production of the hooping ply, a tangent modulus less than or equal to 3 cN/tex/% for any elongation less than or equal to 6%, preferably for any elongation less than or equal to 7%. Each bonded textile wire-like reinforcer element I6 and I7 has, before the step of production of the hooping ply, a tangent modulus less than or equal to 3 cN/tex/% for any elongation less than or equal to 8%. The bonded textile wire-like reinforcer element I7 has, before the step of production of the hooping ply, a tangent modulus less than or equal to 3 cN/tex/% for any elongation less than or equal to 9%.

Each bonded textile wire-like reinforcer element I5 to I7 has, before the step of production of the hooping ply, a tangent modulus less than or equal to 5 cN/tex/% for any elongation less than or equal to 7.5%. Each bonded textile wire-like reinforcer element I6 and I7 has, before the step of production of the hooping ply, a tangent modulus less than or equal to 5 cN/tex/% for any elongation less than or equal to 8.5%, even less than or equal to 9.5%. The bonded textile wire-like reinforcer element I7 has, before the step of production of the hooping ply, a tangent modulus less than or equal to 5 cN/tex/% for any elongation less than or equal to 10.5%.

Each bonded textile wire-like reinforcer element I5 to I7 has, before the step of production of the hooping ply, a tangent modulus less than or equal to 10 cN/tex/% for any elongation less than or equal to 10%. Each bonded textile wire-like reinforcer element I6 and I7 has, before the step of production of the hooping ply, a tangent modulus less than or equal to 10 cN/tex/% for any elongation less than or equal to 11%, even less than or equal to 12%. The bonded textile wire-like reinforcer element I7 has, before the step of production of the hooping ply, a tangent modulus less than or equal to 10 cN/tex/% for any elongation less than or equal to 13%.

Each bonded textile wire-like reinforcer element I5 to I7 has, before the step of production of the hooping ply, a tangent modulus less than or equal to 15 cN/tex/% for any elongation less than or equal to 12%. Each bonded textile wire-like reinforcer element I6 and I7 has, before the step of production of the hooping ply, a tangent modulus less than or equal to 15 cN/tex/% for any elongation less than or equal to 13%, even less than or equal to 14%. The bonded textile wire-like reinforcer element I7 has, before the step of production of the hooping ply, a tangent modulus less than or equal to 15 cN/tex/% for any elongation less than or equal to 15%. Each bonded textile wire-like reinforcer element I5 to I7 has, before the step of production of the hooping ply, an elongation at break greater than or equal to 14%, preferably greater than or equal to 15%. Each bonded textile wire-like reinforcer element I6 and I7 has, before the step of production of the hooping ply, an elongation at break greater than or equal to 16% and even more preferentially greater than or equal to 17%.

For the textile wire-like elements intended to reinforce tyres, the fatigue resistance can be analysed by subjecting these textile wire-like elements to various known laboratory tests, notably the fatigue test known by the name of "belt" test, sometimes called "shoe shine test", a test in which the textile wire-like elements, previously glued together, are incorporated in an elastomeric article. The principle of the "belt" test is as follows: the belt comprises two layers of textile wire-like elements, the first layer comprising the textile wire-like elements for which the desire is to assess the performance, embedded at a pitch of 1.25 mm in two compound skims each of 0.4 mm and a second rigidifying layer making it possible to avoid the elongation of the first layer, this second layer comprising relatively rigid textile wire-like elements and comprising two aramid strands each of 167 tex at a twist of 315 turns per metre and embedded at a pitch of 0.9 mm in two compound skims each of 0.3 mm. The axis of each textile wire-like element is oriented in the longitudinal direction of the belt.

This belt is then subjected to the following stresses: cyclically, using a connecting rod and handle system, the belt is driven around a roller of given diameter, here 15 mm and 20 mm, so that the first layer comprising the textile wire-like elements for which the desire is to assess the performance is in contact with the roller and each elementary portion of the belt is subjected to a tension of 15 daN and undergoes cycles of variation of curvature which make it go from an infinite radius of curvature to a given radius of curvature and do so for 190 000 cycles, at a frequency of 7 Hz. This variation of curvature of the belt subjects the textile wire-like elements of the internal layer, that closest to the roller, to a given geometrical compression according to the chosen roller diameter. At the end of these stresses, the textile wire-like elements are extracted by decortication from the internal layer and the residual breaking force Frr of the fatigued textile wire-like elements is measured. Previously, the initial breaking force Fri was measured, this value corresponding to the force of a textile wire-like element extracted from a new, unstressed belt. Then, the degradation D of the textile wire-like elements is calculated using the formula $D=100\times(1-Frr/Fri)$. Thus, the closer D is to 100, the less compression endurance the textile wire-like element has. Conversely, the closer D is to 0, the more compression endurance the textile wire-like element has.

The results are collected in table 1 below.

TABLE 1

|    | $V_1$ | $V_2$ | $T_{T1}$ | $T_{T2}$ | Degradation D - Diameter of the roller 20 mm | Degradation D - Diameter of the roller 15 mm |
|----|------|-------|----------|----------|----|-----|
| T2 | /    | /     | /        | /        | 95 | 100 |
| I1 | 9.3  | 10.34 | 0.15     | 0.15     | 5  | 50  |
| I2 | 9.3  | 10.36 | 0.15     | 0.15     | 8  | 33  |
| I3 | 9.3  | 10.42 | 0.15     | 0.15     | 9  | 32  |
| I4 | 9.3  | 10.49 | 0.15     | 0.15     | 12 | 29  |
| I5 | 9.3  | 10.55 | 0.15     | 0.15     | 0  | 27  |
| I6 | 9.3  | 10.62 | 0.15     | 0.15     | 7  | 19  |
| I7 | 9.3  | 10.69 | 0.15     | 0.15     | 3  | 21  |

Looking at this table 1 in detail, it can be seen that, whatever the diameter of the roller, the textile wire-like elements I1 to I7 according to the invention have a degradation greatly less than that of the conventional hybrid textile wire-like element T2. Furthermore, even the test using the roller of a diameter equal to 15 mm, imposing greater stress because of the greater radius of curvature of the roller, demonstrates an improvement in the endurance of the textile wire-like elements I1 to I7 compared to the textile wire-like element T2.

Finally, it is noted that, for identical parameters of the steps after the assembly step, the endurance is all the more enhanced when the curve has a low tangent modulus and over great elongations. The inventors behind the invention make the hypothesis that, for parameters of the method for producing the bonded textile wire-like element that are otherwise all equal, the more the core of the textile wire-like element is pulled during its production method (in other words, the higher $T_1$ is relative to $T_2$, or the smaller $V_1$ is relative to $V_2$), the more separated the strands of the layer become relative to the core. Thus, the strands of the layer, in this particular case the aramid strands, have a significant geometrical latitude during the compression of the textile wire-like element. The layer strands are therefore less sensitive to the compression that they are more able to accommodate, for example by assuming a particular position around the core.

Obviously, the invention is not limited to the embodiments previously described.

The invention claimed is:

1. A tire comprising a crown reinforcement, the crown reinforcement comprising a hooping reinforcement, the hooping reinforcement comprising a hooping ply, the hooping ply comprising at least one textile wire-like hoop reinforcer element making an angle strictly less than 10° with a circumferential direction of the tire, the tire being obtained by a method comprising a step of producing the hooping ply in which at least one bonded textile wire-like reinforcing element is embedded in a compound to form the at least one textile wire-like hoop reinforcer element, wherein the at least one bonded textile wire-like reinforcing element has, before the step of producing the hooping ply, a tangent modulus less than or equal to 5 cN/tex/% for any elongation less than or equal to 3%, wherein the at least one textile wire-like hoop reinforcer element has, once extracted from the tire, a tangent modulus greater than or equal to 5 cN/tex/% for any elongation greater than or equal to 4%, and wherein the at least one textile wire-like hoop reinforcer element comprises:

a core composed of a first strand comprising at least one monofilament, and a layer comprising at least two second strands, each second strand of the layer comprising at least one monofilament, each second strand of the layer being helically wound around the core, and each second strand having a count from 130 tex to 220 tex.

2. The tire according to claim 1, wherein the at least one bonded textile wire-like reinforcing element has, before the step of producing the hooping ply, a tangent modulus less than or equal to 3 cN/tex/% for any elongation less than or equal to 2%.

3. The tire according to claim 1, wherein the at least one bonded textile wire-like reinforcing element has, before the step of producing the hooping ply, a tangent modulus less than or equal to 10 cN/tex/% for any elongation less than or equal to 5%.

4. The tire according to claim 1, wherein the at least one bonded textile wire-like reinforcing element has, before the step of producing the hooping ply, a tangent modulus less than or equal to 15 cN/tex/% for any elongation less than or equal to 6%.

5. The tire according to claim 1, wherein the at least one textile wire-like hoop reinforcer element has, once extracted from the tire, a tangent modulus greater than or equal to 5 cN/tex/% for any elongation greater than or equal to 3.5%.

6. The tire according to claim 1, wherein the at least one textile wire-like hoop reinforcer element has, once extracted from the tire, a tangent modulus greater than or equal to 10 cN/tex/% for any elongation greater than or equal to 6%.

7. The tire according to claim 1, wherein the at least one textile wire-like hoop reinforcer element has, once extracted from the tire, a tangent modulus greater than or equal to 15 cN/tex/% for any elongation greater than or equal to 8%.

8. The tire according to claim 1, wherein the at least one textile wire-like hoop reinforcer element has, once extracted from the tire, a tangent modulus greater than or equal to 20 cN/tex/% for any elongation greater than or equal to 8%.

9. The tire according to claim 1, wherein the at least one monofilament of the first strand is a material selected from the group consisting of polyesters, aliphatic polyamides, celluloses, and mixtures thereof.

10. The tire according to claim 1, wherein the at least one monofilament of each second strand is a material selected from the group consisting of aromatic polyamides, aromatic copolyamides, polyketones, and mixtures thereof.

11. The tire according to claim 1, wherein the at least two second strands are three or four second strands.

12. The tire according to claim 1, wherein the twist factor of the first strand of the core ranges from 60 to 80.

13. The tire according to claim 1, wherein the twist factor of each second strand of the layer ranges from 90 to 120.

14. The tire according to claim 1, wherein the twist factor of the at least one textile wire-like hoop reinforcer element ranges from 170 to 220.

* * * * *